United States Patent
Motohashi et al.

(10) Patent No.: US 10,672,141 B2
(45) Date of Patent: Jun. 2, 2020

(54) DEVICE, METHOD, SYSTEM AND COMPUTER-READABLE MEDIUM FOR DETERMINING COLLISION TARGET OBJECT REJECTION

(71) Applicant: RICOH COMPANY, LTD., Tokyo (JP)

(72) Inventors: Naoki Motohashi, Kanagawa (JP); Sadao Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 148 days.

(21) Appl. No.: 15/920,569

(22) Filed: Mar. 14, 2018

(65) Prior Publication Data

US 2018/0204345 A1 Jul. 19, 2018

Related U.S. Application Data

(63) Continuation of application No. PCT/JP2016/073361, filed on Aug. 8, 2016.

(30) Foreign Application Priority Data

Sep. 15, 2015 (JP) .................................. 2015-182206

(51) Int. Cl.
*G06T 7/70* (2017.01)
*G06T 7/593* (2017.01)
(Continued)

(52) U.S. Cl.
CPC ............ *G06T 7/70* (2017.01); *G06K 9/00791* (2013.01); *G06K 9/00805* (2013.01);
(Continued)

(58) Field of Classification Search
CPC ....... G06T 7/70; G06T 7/593; G06K 9/00791; G06K 9/00805; G08G 1/16
See application file for complete search history.

(56) References Cited

U.S. PATENT DOCUMENTS 6,963,657 B1 * 11/2005 Nishigaki ............... G01S 11/12
340/901
8,301,344 B2 * 10/2012 Simon ..................... B60R 1/00
701/45
(Continued)

FOREIGN PATENT DOCUMENTS

EP 2 711 867 A2 3/2014
JP 2004-048295 2/2004
(Continued)

OTHER PUBLICATIONS

Seki, Akihito, and Masatoshi Okutomi. "Robust obstacle detection in general road environment based on road extraction and pose estimation." Electronics and Communications in Japan (Part II: Electronics) 90.12 (2007): 12-22. (Year: 2007).*
(Continued)

*Primary Examiner* — David F Dunphy
(74) *Attorney, Agent, or Firm* — Xsensus LLP

(57) ABSTRACT

An image processing device includes an input unit, a detecting unit, a calculating unit, and a determining unit. The input unit is configured to receive a recognized image representing an object. The detecting unit is configured to detect at least one surface of the object from a corresponding recognized image corresponding to the recognized image, the corresponding recognized image being on a frequency image indicating frequencies on a plane, the frequencies being of distance values corresponding to pixels of the recognized image. The calculating unit is configured to calculate an angle of the at least one surface with respect to a predetermined direction. The determining unit is configured to determine, based on the at least one surface detected by the detecting unit and the angle calculated by the calculating unit, whether or not the recognized image is to be rejected.

20 Claims, 22 Drawing Sheets

(51) Int. Cl.
*G06K 9/00* (2006.01)
*G08G 1/16* (2006.01)

(52) U.S. Cl.
CPC .............. *G06T 7/593* (2017.01); *G08G 1/16* (2013.01); *G06T 2207/30261* (2013.01)

(56) References Cited

U.S. PATENT DOCUMENTS

| | | | |
|---|---|---|---|
| 9,311,542 B2 | 4/2016 | Liu et al. | |
| 10,354,368 B2* | 7/2019 | Naserian | G06T 5/002 |
| 2010/0231717 A1 | 9/2010 | Sasaki et al. | |
| 2011/0050714 A1 | 3/2011 | Sekiguchi et al. | |
| 2011/0211068 A1 | 9/2011 | Yokota | |
| 2012/0242835 A1 | 9/2012 | Li et al. | |
| 2013/0010106 A1 | 1/2013 | Yokota | |
| 2013/0057707 A1 | 3/2013 | Hasegawa et al. | |
| 2013/0250109 A1 | 9/2013 | Yokota | |
| 2014/0218481 A1* | 8/2014 | Hegemann | G01S 17/89 348/46 |
| 2014/0232826 A1* | 8/2014 | Halata | B66F 9/0755 348/46 |
| 2015/0049195 A1 | 2/2015 | Ishigaki et al. | |
| 2015/0057833 A1* | 2/2015 | Moriuchi | G01S 7/03 701/1 |
| 2015/0212198 A1* | 7/2015 | Nishio | G01S 7/415 342/385 |
| 2015/0248594 A1 | 9/2015 | Zhong et al. | |
| 2015/0294160 A1 | 10/2015 | Takahashi et al. | |
| 2015/0302560 A1 | 10/2015 | Sumiyoshi | |
| 2015/0332103 A1 | 11/2015 | Yokota et al. | |
| 2015/0334269 A1 | 11/2015 | Yokota et al. | |
| 2015/0338516 A1* | 11/2015 | Kijima | G08G 1/166 701/1 |
| 2015/0358610 A1 | 12/2015 | Takahashi et al. | |
| 2016/0014406 A1 | 1/2016 | Takahashi et al. | |
| 2016/0019429 A1* | 1/2016 | Ishigaki | G06F 16/583 348/47 |
| 2016/0131579 A1 | 5/2016 | Sekiguchi et al. | |
| 2016/0261848 A1 | 9/2016 | Sekiguchi et al. | |
| 2016/0307054 A1* | 10/2016 | Takemura | G06K 9/00791 |
| 2016/0307055 A1* | 10/2016 | Nishijima | G06K 9/00791 |
| 2018/0336701 A1* | 11/2018 | Yokota | B60R 21/00 |
| 2018/0342160 A1* | 11/2018 | Komori | G08G 1/166 |
| 2019/0012798 A1* | 1/2019 | Amano | B60W 30/08 |
| 2019/0092329 A1* | 3/2019 | Masui | B60W 30/165 |
| 2019/0106102 A1* | 4/2019 | Igarashi | B60W 30/09 |
| 2019/0263398 A1* | 8/2019 | Matsunaga | G05D 1/0246 |

FOREIGN PATENT DOCUMENTS

| | | |
|---|---|---|
| JP | 2005-311691 | 11/2005 |
| JP | 2009-294842 | 12/2009 |
| JP | 2010-256040 | 11/2010 |
| JP | 2013-097392 | 5/2013 |
| JP | 2017-027578 A | 2/2017 |
| JP | 2017-052498 | 3/2017 |

OTHER PUBLICATIONS

International Search Report dated Oct. 18, 2016 in PCT/JP2016/073361 filed Aug. 8, 2016 (with English Translation).
Written Opinion dated Oct. 18, 2016 in PCT/JP2016/073361 filed Aug. 8, 2016.
Partial Supplementary European Search Report dated Jul 9, 2018 in Patent Application No. 16846155.6, 12 pages.
Hu Z. et al., "A Complete U-V-Disparity Study for Stereovision Based 3D Driving Environment Analysis", Proceedings of the Fifth International Conference on 3-D Digital Imaging and Modeling (3DIM'05), XP10810998, 2005, 8 pages.

* cited by examiner

FIG.1
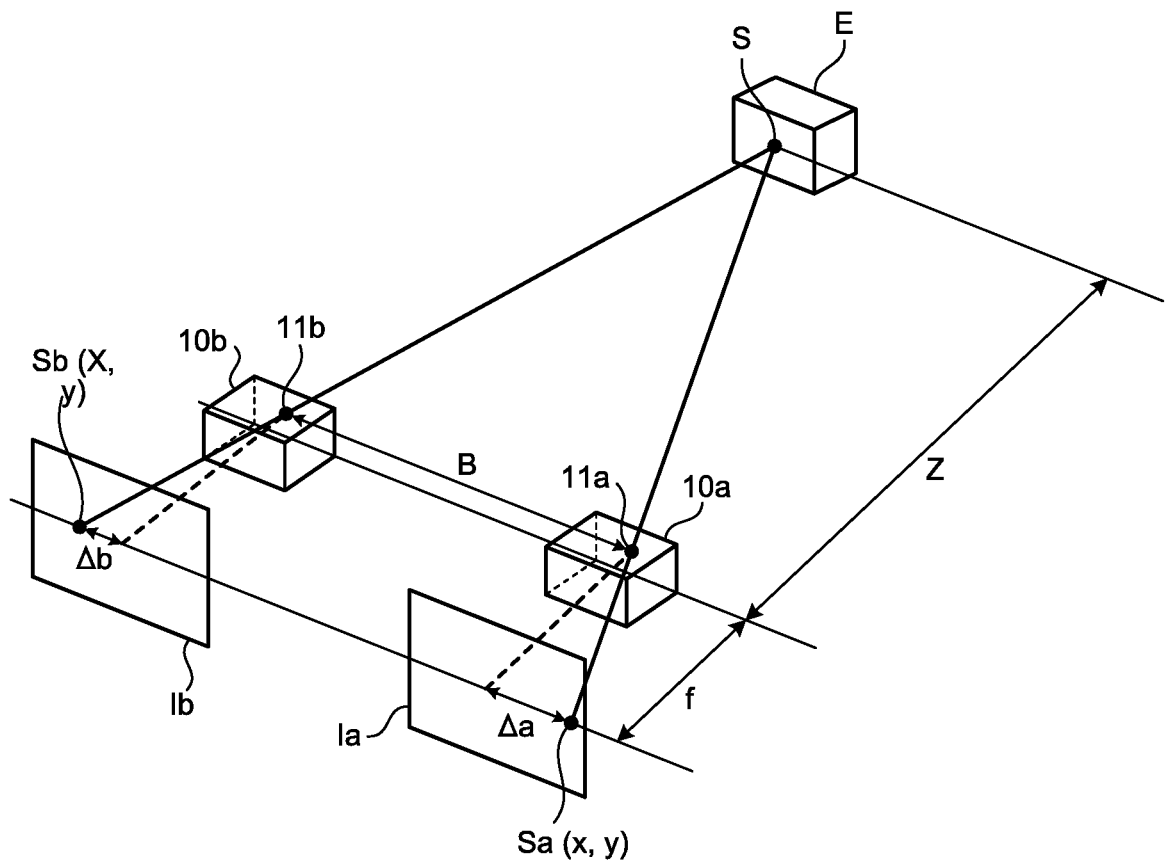
FIG.2
(a) 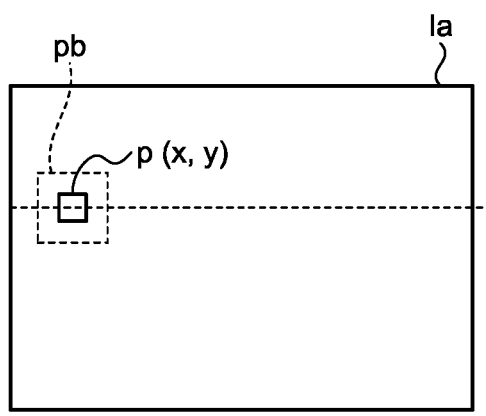
(b) 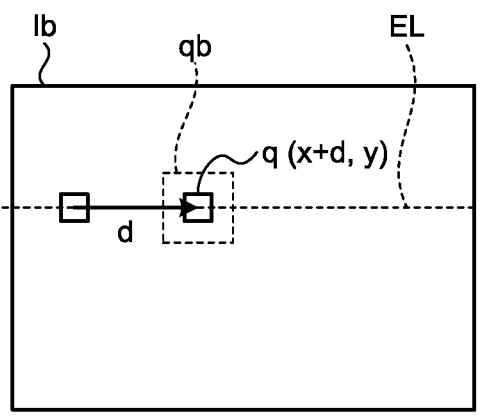

LEFT PRECEDING CAR

FRONT PRECEDING CAR

RIGHT PRECEDING CAR

DEVICE, METHOD, SYSTEM AND COMPUTER-READABLE MEDIUM FOR DETERMINING COLLISION TARGET OBJECT REJECTION

CROSS-REFERENCE TO RELATED APPLICATIONS

The present application is a continuation application of International Application No. PCT/JP2016/073361, filed Aug. 8, 2016, which claims priority to Japanese Patent Application No. 2015-182206, filed Sep. 15, 2015. The contents of these applications are incorporated herein by reference in their entirety.

BACKGROUND OF THE INVENTION

1. Field of the Invention

The present invention relates to an image processing device, an object recognition device, a device control system, an image processing method, and a computer-readable medium.

2. Description of the Related Art

Conventionally, for safety of automobiles, in terms of how a pedestrian is able to be guarded and passengers are able to be protected upon a collision between the pedestrian and an automobile, body structures and the like of automobiles have been developed. However, in recent years, due to advancement in information processing technology and image processing technology, techniques for detecting humans and automobiles fast have been developed. By application of these techniques, an automobile, which prevents collision by automatic braking before the automobile collides with an object, has been developed already. For automatic control of an automobile, a distance to an object, such as a human or another car, needs to be measured accurately, and for the accurate measurement, distance measurement by use of millimetric wave radar and laser radar, distance measurement by use of a stereo camera, and the like have been put into use. For practical application of an on-board object recognition technique, objects that have been captured on a screen need to be recognized based on information obtained by distance measurement through any of the above mentioned techniques, and control needs to be executed for each of the objects. For example, the control may be changed according to whether a recognized object is a pedestrian or a vehicle.

However, in addition to a target to be recognized, such as a pedestrian or a vehicle, an object not to be recognized or not needed to be recognized is often in an image captured when the automobile is running. Incorrect recognition of such an object causes incorrect control, and may cause a dangerous action, such as sudden braking or sudden start. When a stereo camera is used as a technique for recognizing objects, each object is recognized by derivation of disparity of the object that has been captured in a captured luminance image and putting together pixels having similar disparity values into one (clustering processing). Therefore, from objects, for which disparity is able to be derived, an object not to be recognized or not needed to be recognized as mentioned above may be recognized. In particular, side wall objects, such as guard rails, which are objects not needed to be recognized, often appear, because vehicles travel on roads. In automotive control, a use where other vehicles are recognized and these vehicles are tracked is supposed, but incorrect recognition of a side wall object as described above causes incorrect control and may cause danger.

Objects, such as the above mentioned side wall objects, are desirably removed at the time of recognition, and prevented from being sent to the controlling side. Taking measures, such as removal of a recognized object at the recognition processing side such that the recognized object is not used in the automatic control, as described above, will be referred to as "rejection". When a recognized image where a side wall object as mentioned above has been recognized is to be rejected, a shape and a position of the object need to be recognized accurately. Further, for example, since side wall objects and vehicles have similar shapes (for example, both have surfaces), unless appropriate features are selected, a vehicle to be made a target of tracking may be incorrectly rejected.

Recognition of other vehicles and humans used for automatic control of a vehicle as described above may be referred to as "correct recognition".

As such a technique for accurately determining whether or not an object in a captured image is a target to be recognized, a method has been disclosed (Japanese Unexamined Patent Application Publication No. 2005-311691), in which: recognition candidates are extracted; an identification value for each of the recognition candidates is calculated based on a model prepared beforehand; and if the identification value clearly falls within a range not to be recognized, that recognition candidate is rejected.

However, the technique described in Japanese Unexamined Patent Application Publication No. 2005-311691 has a problem that accuracy of the rejection is dependent on the models (templates) prepared beforehand, and has a problem that even when an image is to be rejected, if the image is of an object that largely differs from the template, the image may be unable to be rejected, and the object that has not been correctly recognized may be tracked. In particular, shapes of side wall objects vary depending on roads, all of these shapes are difficult to be recognized by use of a single model (template), and when various side wall objects are attempted to be recognized, many models need to be prepared beforehand and the recognized images need to be collated with these models; and thus there is a problem that calculation cost becomes high, and installation in an on-board recognition device, for which speed is demanded, becomes difficult.

SUMMARY OF THE INVENTION

According to one aspect of the present invention, an image processing device includes an input unit, a detecting unit, a calculating unit, and a determining unit. The input unit is configured to receive a recognized image representing an object. The detecting unit is configured to detect at least one surface of the object from a corresponding recognized image corresponding to the recognized image, the corresponding recognized image being on a frequency image indicating frequencies on a plane, the frequencies being of distance values corresponding to pixels of the recognized image. The calculating unit is configured to calculate an angle of the at least one surface with respect to a predetermined direction. The determining unit is configured to determine, based on the at least one surface detected by the detecting unit and the angle calculated by the calculating unit, whether or not the recognized image is to be rejected.

BRIEF DESCRIPTION OF THE DRAWINGS

FIG. 1 is a diagram for explanation of the principle of derivation of a distance from imaging portions to an object;

FIG. 2 is an explanatory diagram for a case where a corresponding pixel is found in a compared image, the corresponding pixel corresponding to a reference pixel in a reference image;

DETAILED DESCRIPTION OF THE PREFERRED EMBODIMENTS

Figure 3:
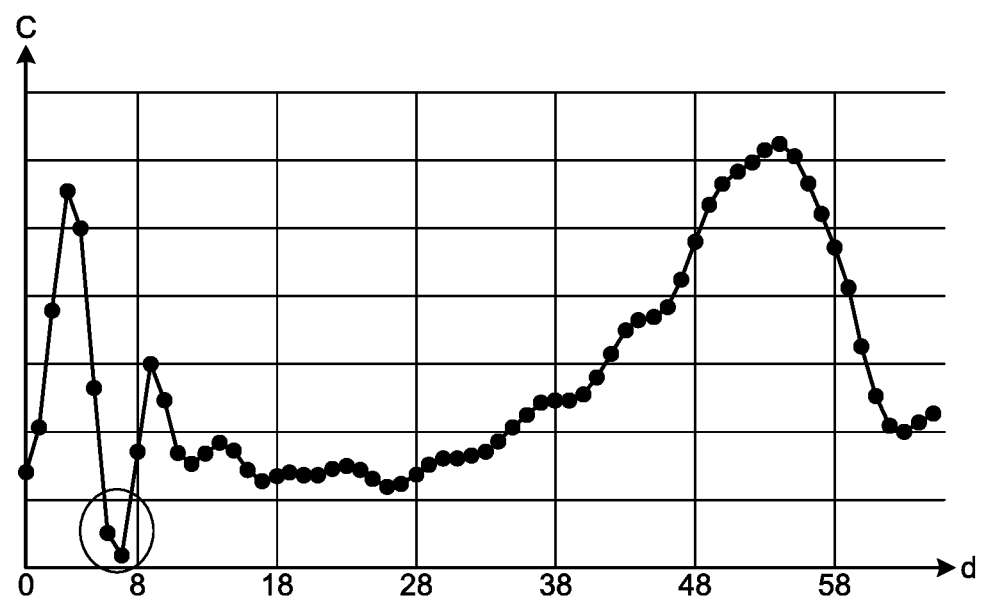
FIG. 3 is a diagram illustrating an example of a graph of results of matching processing.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an image processing device, an object recognition device, a device control system, an image processing method, and a computer-readable medium, which enable improvement in accuracy of rejection of recognized objects.

[Outline of Distant Measurement Method Using Block Matching Processing]

First of all, by use of FIG. 1 to FIG. 3, an outline of a distance measurement method by block matching processing will be described.

(Principle of Distance Measurement)

FIG. 1 is a diagram for explanation of the principle of derivation of a distance from imaging portions to an object. While reference is made to FIG. 1, the principle of measurement of a distance to an object from a stereo camera will be described, the measurement being executed by: derivation of disparity from the stereo camera to the object through stereo matching processing; and use of disparity values indicating this disparity.

An imaging system illustrated in FIG. 1 includes an imaging portion 10a (first imaging unit) and an imaging portion 10b (second imaging unit), which are arranged parallel to each other at the same level. The imaging portions 10a and 10b include imaging lenses 11a and 11b, respectively, that refract incoming light and cause images of an object to be formed on image sensors, which are solid state image sensing devices. Images captured by the imaging portion 10a and the imaging portion 10b will be referred to as a reference image Ia (first captured image) and a compared image Ib (second captured image), respectively. In FIG. 1, a point S on an object E in a three dimensional space is mapped over to a position on a straight line parallel to a straight line joining the imaging lens 11a to the imaging lens 11b, in each of the reference image Ia and the compared image Ib. The point S is mapped over to these images as a point Sa (x, y) in the reference image Ia and a point Sb (X, y) in the compared image Ib. A disparity value dp is expressed by the following Equation 1 by use of the point Sa (x, y) at coordinates on the reference image Ia and the point Sb (X, y) at coordinates on the compared image Ib.

$$dp = X - x \quad (1)$$

Further, the disparity value dp may be expressed as dp=Δa+Δb, where, in FIG. 1, a distance between the point Sa (x, y) and an intersection of a perpendicular drawn from the imaging lens 11a to an imaging plane thereof is Δa, and a distance between the point Sb (X, y) in the compared image Ib and an intersection of a perpendicular drawn from the imaging lens 11b to an imaging plane thereof is Δb.

Next, by use of the disparity value dp, a distance X between the imaging portions 10a and 10b and the object E is derived. The distance Z is a distance, from a straight line joining a focal position of the imaging lens 11a to a focal position of the imaging lens 11b, to the point S on the object E. As illustrated in FIG. 1, by use of a focal length f of the imaging lens 11a and imaging lens 11b, a base line length B that is a length between the imaging lens 11a and the imaging lens 11b, and the disparity value dp; the distance Z is able to be calculated by the following Equation 2.

$$Z = (B \times f)/dp \quad (2)$$

Equation 2 indicates that the larger the disparity value dp is, the smaller the distance Z is, and the smaller the disparity value dp is, the larger the distance Z is.

(Block Matching Processing)

Next, by use of FIG. 2 and FIG. 3, the distance measurement method by block matching processing will be described.

FIG. 2 is an explanatory diagram for a case where a corresponding pixel is found in a compared image, the corresponding pixel corresponding to a reference pixel in a reference image. FIG. 3 is a diagram illustrating an example of results of matching processing.

While reference is made to FIG. 2 and FIG. 3, a method of calculating cost value C (p, d) will be described. Hereinafter, C (p, d) will be described as representing C (x, y, d).

In FIG. 2, a conceptual diagram illustrating a reference pixel p and a reference area pb in the reference image Ia is at (a), and a conceptual diagram for when the cost value C is calculated while candidates for a corresponding pixel in the compared image Ib are sequentially shifted (changed over), the corresponding pixel corresponding to the reference pixel p illustrated at (a), is at (b). The corresponding pixel is a pixel in the compared image Ib, the pixel being the most similar to the reference pixel p in the reference image Ia. Further, a cost value C is an evaluation value (a degree of coincidence) indicating a similarity or a non-similarity of each pixel in the compared image Ib with respect to the reference pixel p in the reference image Ia. The cost value C will be described as the evaluation value indicating the non-similarity, such that the smaller the cost value C is, the more similar the pixel in the compared image Ib is to the reference pixel p.

As illustrated at (a) in FIG. 2, based on luminance values (pixel values) of: the reference pixel p (x, y) in the reference image Ia; and a candidate pixel q (x+d, y), which is a candidate for the corresponding pixel on an epipolar line EL in the compared image Ib with respect to the reference pixel p (x, y); a cost value C (p, d) of the candidate pixel q (x+d, y) for the corresponding pixel with respect to the reference pixel p (x, y) is calculated. Herein, d is a shift amount (deviation amount) between the reference pixel p and the candidate pixel q, and the shift amount d is shifted pixel by pixel. That is, while the candidate pixel q (x+d, y) is sequentially shifted by one pixel in a prespecified range (for example, 0<d<25), the cost value C (p, d), which is the non-similarity between the luminance values of the candidate pixel q (x+d, y) and the reference pixel p (x, y), is calculated. Further, as the stereo matching processing for finding the corresponding pixel for the reference pixel p, block matching (template matching) processing is executed in this embodiment. In the block matching processing, a non-similarity between the reference area pb, which is a predetermined area around the reference pixel p of the reference image Ia, and a candidate area qb (having the same size as the reference area pb) around the candidate pixel q of the compared image Ib is found. As a cost value C indicating the non-similarity between the reference area pb and the candidate area qb, the sum of absolute differences (SAD), the sum of squared differences (SSD), the zero-mean-sum of squared differences (ZSSD) obtained by subtraction of an average value of each block from the SSD value, or the like is used. The higher the correlation (the higher the degree of similarity) is, the smaller these evaluation values become, and thus these evaluation values indicate non-similarity.

Since the imaging portions 10a and 10b are arranged parallel to each other at the same level as described above, the reference image Ia and the compared image Ib are also in a relation of being parallel to each other at the same level. Therefore, the corresponding pixel in the compared image Ib, the corresponding pixel corresponding to the reference pixel p in the reference image Ia, is present on the epipolar line EL illustrated in FIG. 2 as a line in a transverse direction in the paper's planar view, and pixels on the epipolar line EL in the compared image Ib are searched for the corresponding pixel in the compared image Ib to be found.

The cost value C (p, d) calculated by this block matching processing is represented by, for example, a graph illustrated in FIG. 3, in relation to the shift amount d. In the example in FIG. 3, the cost value C has the minimum value when the shift amount d=7, and thus a disparity value dp=7 is derived therefrom.

Hereinafter, while reference is made to FIG. 4A to FIG. 26, embodiments of an image processing device, an object recognition device, a device control system, an image processing method, and a computer-readable medium, according to the present invention, will be described in detail. Further, the present invention is not limited by the following embodiments, and components in the following embodiments include any component that a person skilled in the art can easily arrive at, any component that is substantially the same, and any component in the so-called equivalent scope. Furthermore, various omissions, substitutions, modifications, and combinations, of the components without departing from the gist of the following embodiments may be implemented.

First Embodiment

Hereinafter, by use of FIG. 4A to FIG. 22, specific description of a first embodiment will be made. Herein, a case where an object recognition device 1 that executes block matching processing is installed in an automobile will be described as an example.

(Schematic Configuration of Vehicle Including Object Recognition Device)

Figure 4A:
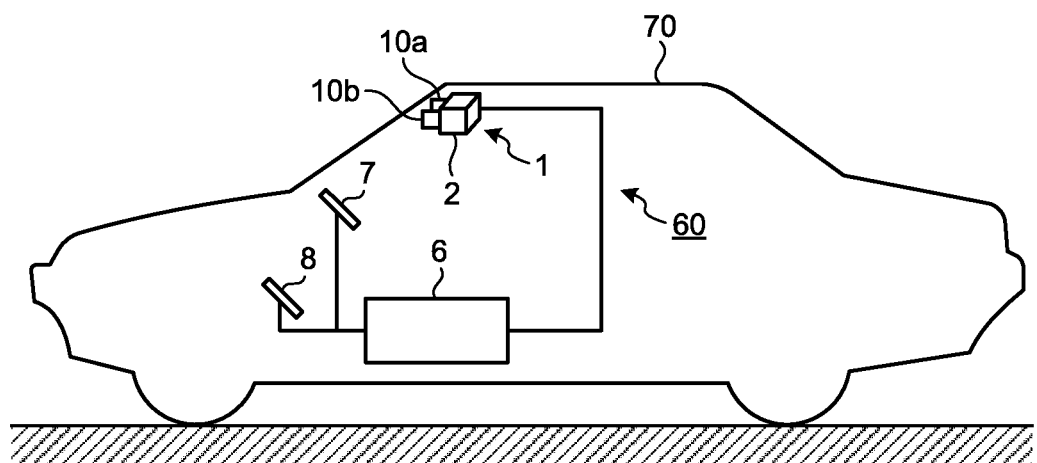
FIGS. 4A and 4B are views illustrating an example, in which a device control system according to a first embodiment has been installed in a vehicle.

FIGS. 4A and AB are views illustrating an example, in which a device control system according to the first embodiment has been installed in a vehicle. While reference is made to FIGS. 4A and 4B, a vehicle 70 installed with a device control system 60 according to this embodiment will be described. FIG. 4A is a side view of the vehicle 70 installed with the device control system 60, and FIG. 4B is a front view of the vehicle 70.

Figure 4B:
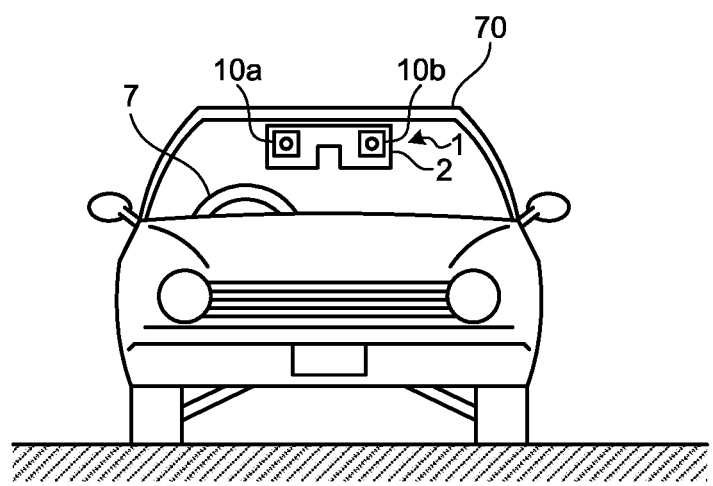

As illustrated in FIGS. 4A and 4B, the vehicle 70, which is an automobile, includes the device control system 60 installed therein. The device control system 60 includes: the object recognition device 1 installed in the vehicle interior that is a room space in the vehicle 70; a vehicle control device 6 (control device); a steering wheel 7; and a brake pedal 8.

The object recognition device 1 has an imaging function of imaging a traveling direction of the vehicle 70, and is installed near, for example, a back mirror inside a front window of the vehicle 70. Although details thereof will be described later, the object recognition device 1 includes a main body portion 2, and the imaging portion 10a and the imaging portion 10b that are fixed to the main body portion 2. The imaging portions 10a and 10b are fixed to the main body portion 2 so as to be able to image a subject in the traveling direction of the vehicle 70.

The vehicle control device 6 is an electronic control unit (ECU) that executes, based on recognition information received from the object recognition device 1, tracking operation or the like on a recognized object to execute various kinds of vehicle control. The vehicle control device 6 executes, as an example of the vehicle control, steering control of controlling a steering system (control target) including the steering wheel 7 to avoid an obstacle, or brake control of controlling the brake pedal 8 (control target) to decelerate and stop the vehicle 70, based on the recognition information received from the object recognition device 1.

By execution of vehicle control, such as steering control or brake control, like in this device control system 60 including the object recognition device 1 and the vehicle control device 6, safety of driving of the vehicle 70 is able to be improved.

As described above, the object recognition device 1 images the front of the vehicle 70, but is not limited to this imaging. That is, the object recognition device 1 may be installed so as to image the rear or the side of the vehicle 70. In that case, the object recognition device 1 is able to detect positions of: following cars and humans behind the vehicle 70; or other vehicles, humans, and the like lateral to the vehicle 70. The vehicle control device 6 is able to detect danger at the time of lane changing, at the time of lane merging, or the like, of the vehicle 70 and execute the above described vehicle control. Further, in backward driving at the time of parking or the like of the vehicle 70, the vehicle control device 6 may execute the above described vehicle control when the vehicle control device 6 determines that there is a risk of collision, based on recognition information for an obstacle behind the vehicle 70, the recognition information having been output from the object recognition device 1.

(Configuration of Object Recognition Device)

Figure 5:
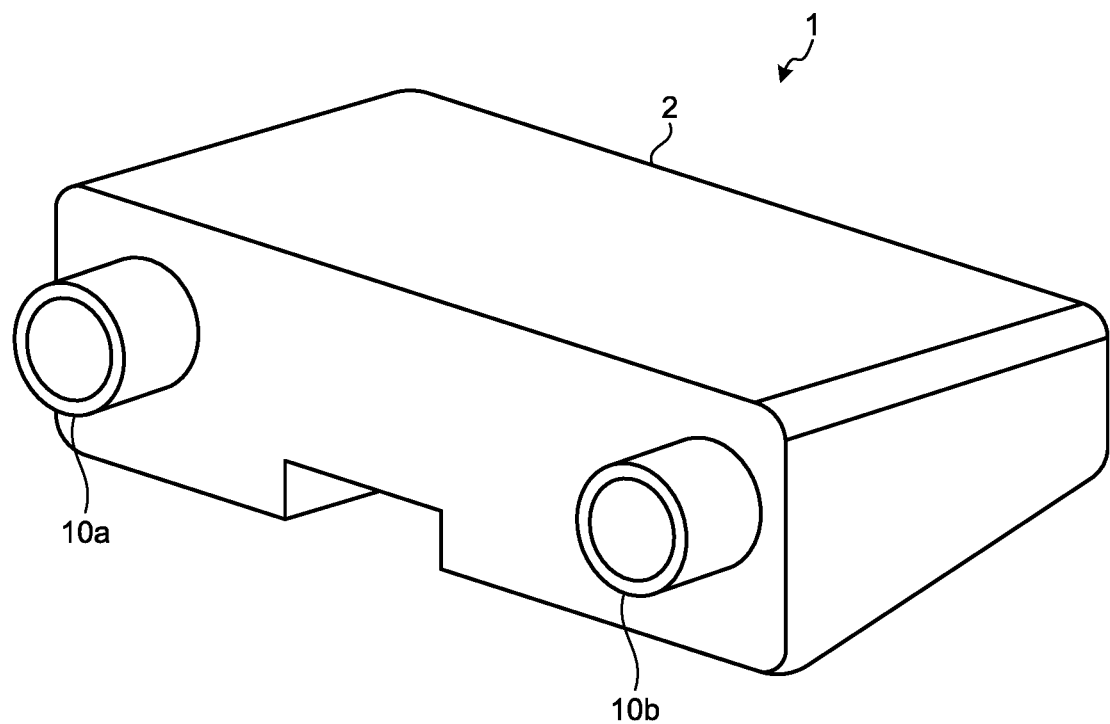
FIG. 5 is a view illustrating an example of an external appearance of an object recognition device according to the first embodiment.

FIG. 5 is a view illustrating an example of an external appearance of the object recognition device according to the first embodiment. As illustrated in FIG. 5, the object recognition device 1 includes, as described above, the main body portion 2, and the imaging portion 10a and imaging portion 10b fixed to the main body portion 2. The imaging portions 10a and 10b are formed of a pair of cylindrical cameras arranged parallel to each other and at the same level in the main body portion 2. Further, for the convenience of explanation, the imaging portion 10a illustrated in FIG. 5 will be referred to as a "right" camera, and the imaging portion 10b will be referred to as a "left" camera.

<Hardware Configuration of Object Recognition Device>

Figure 6:
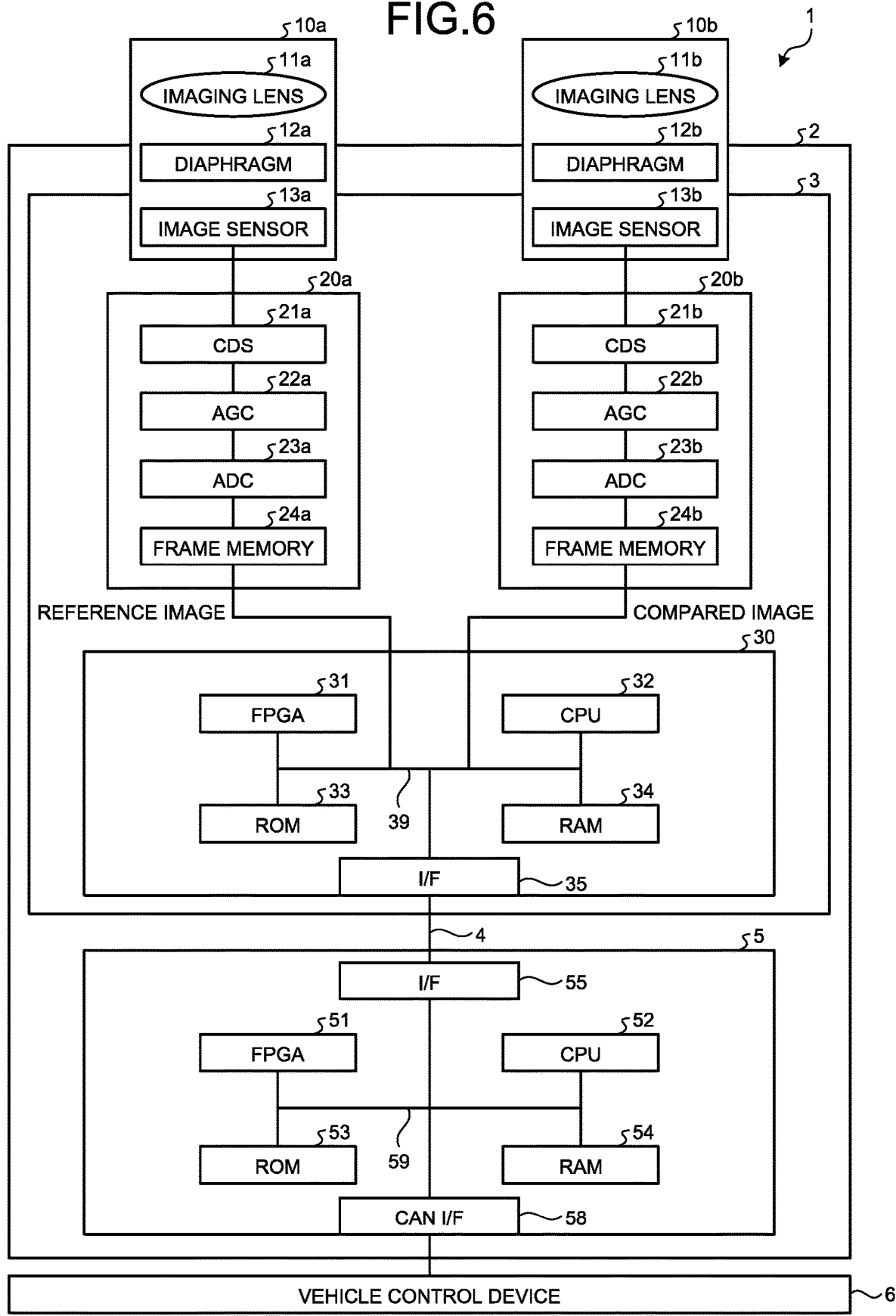
FIG. 6 is a diagram illustrating an example of a hardware configuration of the object recognition device according to the first embodiment.

FIG. 6 is a diagram illustrating an example of a hardware configuration of the object recognition device according to the first embodiment. While reference is made to FIG. 6, a hardware configuration of the object recognition device 1 will be described.

As illustrated in FIG. 6, the object recognition device 1 includes, in the main body portion 2, a disparity value deriving portion 3 and a recognition processing portion 5.

The disparity value deriving portion 3 derives disparity values dp indicating disparity with respect to an object, from plural images acquired by imaging of the object, and outputs a disparity image indicating the disparity value dp at each pixel. The recognition processing portion 5 executes recognition processing or the like for objects, such as a human and a car, captured in a captured image, based on the disparity image output from the disparity value deriving portion 3, and outputs recognition information that is information indicating results of the recognition processing, to the vehicle control device 6. In this embodiment, the disparity values dp are described as an example of distance values that are values indicating distance.

As illustrated in FIG. 6, the disparity value deriving portion 3 includes the imaging portion 10a, the imaging portion 10b, a signal conversion portion 20a, a signal conversion portion 20b, and an image processing portion 30.

The imaging portion 10a is a processing portion that images a subject in front of the imaging portion 10a and generates an analog image signal. The imaging portion 10a includes the imaging lens 11a, a diaphragm 12a, and an image sensor 13a.

The imaging lens 11a is an optical element for diffracting incoming light and forming an image of an object on the image sensor 13a. The diaphragm 12a is a member for blocking a part of light that has passed the imaging lens 11a to adjust the amount of light incident on the image sensor 13a. The image sensor 13a is a semiconductor element that converts light that has entered through the imaging lens 11a and passed through the diaphragm 12a, into an electric analog image signal. The image sensor 13a is realized by a solid state imaging element, such as a charge coupled device (CCD) or a complementary metal oxide semiconductor (CMOS).

The imaging portion 10b is a processing portion that images a subject in front of the imaging portion 10b and generates an analog image signal. The imaging portion 10b includes the imaging lens 11b, a diaphragm 12b, and an image sensor 13b. Functions of the imaging lens 11b, the diaphragm 12b, and the image sensor 13b are the same as the above described functions of the imaging lens 11a, the diaphragm 12a, and the image sensor 13a, respectively. Further, the imaging lens 11a and the imaging lens 11b are installed such that the lens surfaces are on the same plane, so that imaging conditions of the left and right cameras are the same.

The signal conversion portion 20a is a processing portion that converts the analog image signal generated by the imaging portion 10a into image data of a digital format. The signal conversion portion 20a includes a Correlated Double Sampling (CDS) 21a, an Auto Gain Control (AGC) 22a, an analog digital converter (ADC) 23a, and a frame memory 24a.

The CDS 21a removes noise from the analog image signal generated by the image sensor 13a, by correlated double sampling, a transverse differential filter, a longitudinal smoothing filter, or the like. The AGC 22a executes gain control of controlling intensity of the analog image signal, from which the noise has been removed by the CDS 21a. The ADC 23a converts the analog image signal that has been subjected to the gain control by the AGC 22a, into image data of a digital format. The frame memory 24a stores therein the image data converted by the ADC 23a.

The signal conversion portion 20b is a processing portion that converts the analog image signal generated by the imaging portion 10b into image data of a digital format. The signal conversion portion 20b includes a CDS 21b, an AGC 22b, an ADC 23b, and a frame memory 24b. Functions of the CDS 21b, AGC 22b, ADC 23b, and frame memory 24b are the same as the above described functions of the CDS 21a, AGC 22a, ADC 23a, and frame memory 24a, respectively.

The image processing portion 30 is a device that executes image processing on the image data converted by the signal conversion portion 20a and the signal conversion portion 20b. The image processing portion 30 includes a field programmable gate array (FPGA) 31, a central processing unit (CPU) 32, a read only memory (ROM) 33, a random access memory (RAM) 34, an interface (I/F) 35, and a bus line 39.

The FPGA 31 is an integrated circuit, and herein, executes processing of deriving disparity values dp in an image based on the image data. The CPU 32 controls each function of the disparity value deriving portion 3. The ROM 33 stores therein an image processing program executed by the CPU 32 for the control of each function of the disparity value deriving portion 3. The RAM 34 is used as a work area of the CPU 32. The I/F 35 is an interface for communication with an I/F 55 in the recognition processing portion 5 via a communication line 4. The bus line 39 is, as illustrated in FIG. 6, an address bus, a data bus, and the like, which connect the FPGA 31, CPU 32, ROM 33, RAM 34, and I/F 35, communicatably with one another.

The image processing portion 30 includes the FPGA 31 as an integrated circuit that derives disparity values dp, but is not limited thereto, and the integrated circuit may be an application specific integrated circuit (ASIC), or the like.

As illustrated in FIG. 6, the recognition processing portion 5 includes an FPGA 51, a CPU 52, a ROM 53, a RAM 54, an I/F 55, a controller area network (CAN) I/F 58, and a bus line 59.

The FPGA 51 is an integrated circuit, and herein, executes recognition processing for an object, based on a disparity image received from the image processing portion 30. The CPU 52 controls each function of the recognition processing portion 5. The ROM 53 stores therein a recognition processing program, through which the CPU 52 executes recognition processing of the recognition processing portion 5. The RAM 54 is used as a work area of the CPU 52. The I/F 55 is an interface for data communication with the I/F 35 of the image processing portion 30 via the communication line 4. The CAN I/F 58 is an interface for communication with an external controller (for example, the vehicle control device illustrated in FIG. 7), and is, for example, connected to a CAN or the like of the automobile. The bus line 59 is, as illustrated in FIG. 6, an address bus, a data bus, and the like, which connect the FPGA 51, CPU 52, ROM 53, RAM 54, I/F 55, and CAN I/F 58, communicatably with one another.

By this configuration, when a disparity image is transmitted from the I/F 35 of the image processing portion 30 via the communication line 4 to the recognition processing portion 5, the FPGA 51 executes, according to commands from the CPU 52 in the recognition processing portion 5 and based on the disparity image, recognition processing and the like for objects, such as a human and a car, captured in the captured image.

Each of the above described programs may be recorded on a computer readable recording medium as a file in an installable format or an executable format and be distributed. This recording medium is a compact disc read only memory (CD-ROM), a secure digital (SD) memory card, or the like.

<Configurations and Operations of Functional Blocks of Object Recognition Device>

Figure 7:
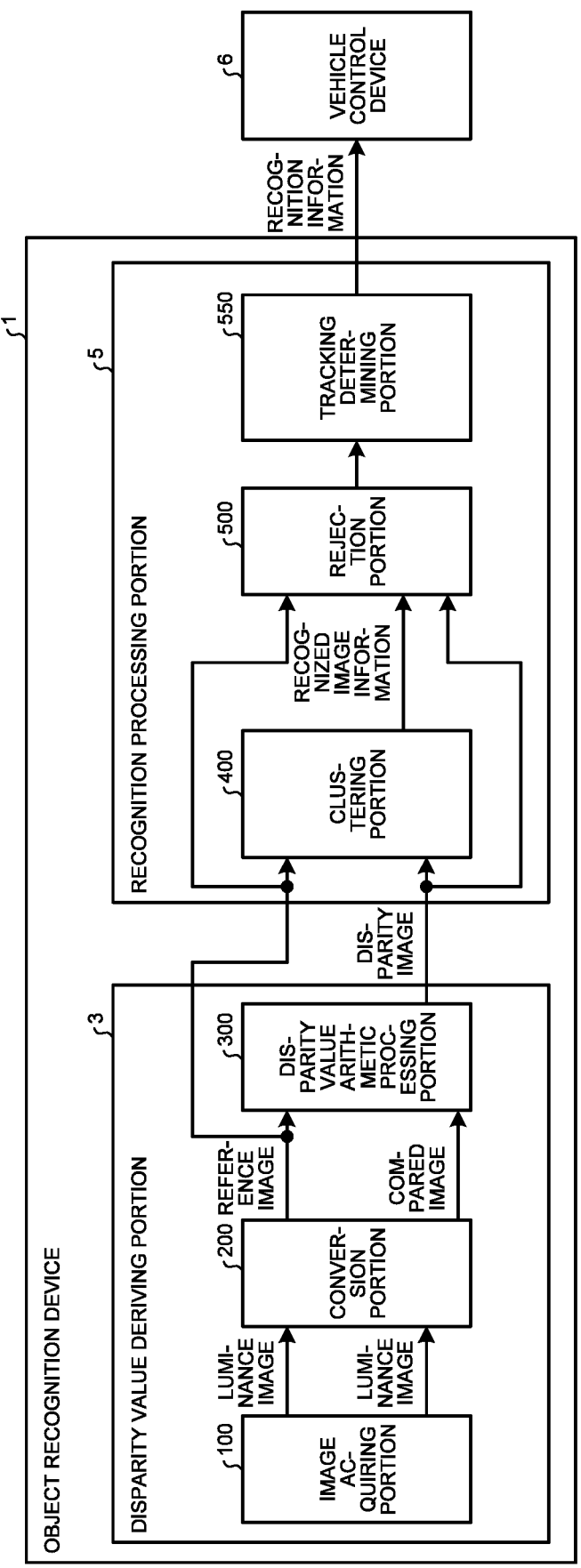
FIG. 7 is a diagram illustrating an example of a functional block configuration of the object recognition device according to the first embodiment.
Figure 8:
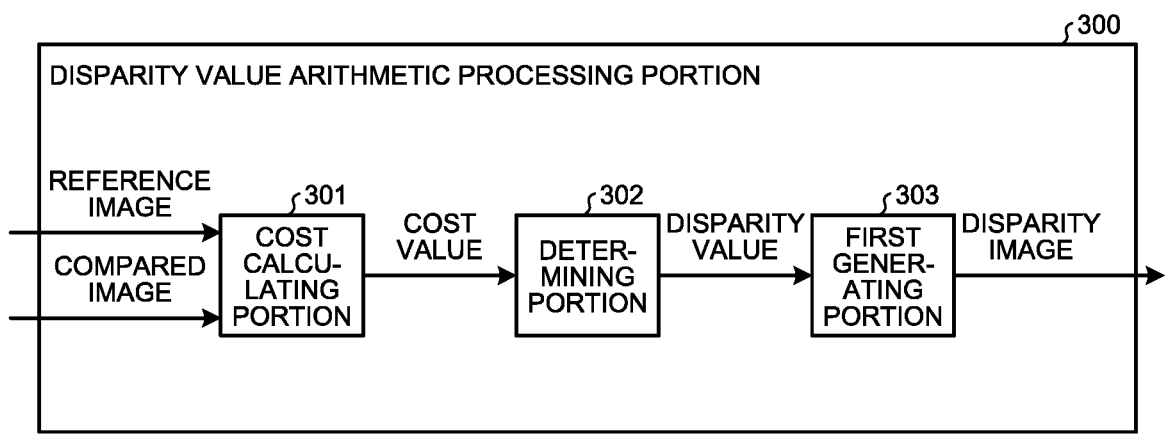
FIG. 8 is a diagram illustrating an example of a functional block configuration of a disparity value arithmetic processing portion of the object recognition device according to the first embodiment.
Figure 9:
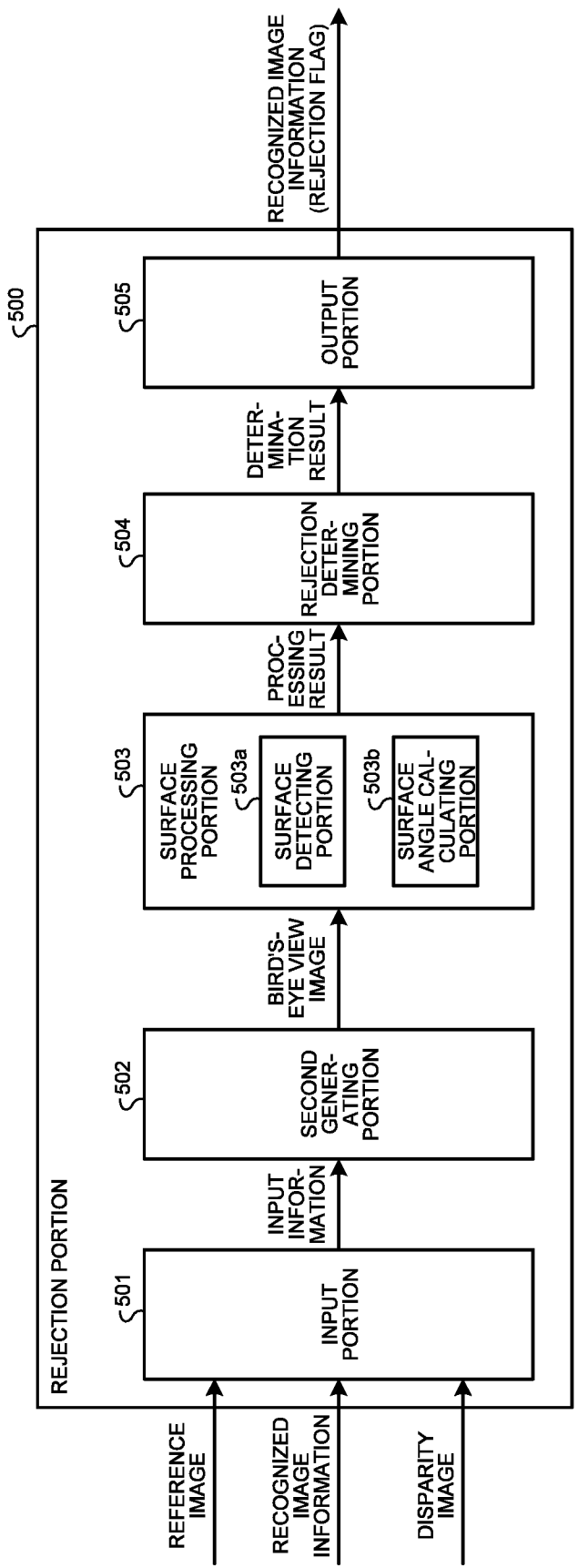
FIG. 9 is a diagram illustrating an example of a functional block configuration of a rejection portion of the object recognition device according to the first embodiment.

FIG. 7 is a diagram illustrating an example of a functional block configuration of the object recognition device according to the first embodiment. FIG. 8 is a diagram illustrating an example of a functional block configuration of a disparity value arithmetic processing portion of the object recognition device according to the first embodiment. FIG. 9 is a diagram illustrating an example of a functional block configuration of a rejection portion of the object recognition device according to the first embodiment. While reference is made to FIG. 7 to FIG. 9, configurations and operations of functional blocks of main parts of the object recognition device 1 will be described.

As already described with respect to FIG. 6, as illustrated in FIG. 7, the object recognition device 1 includes the disparity value deriving portion 3 and the recognition processing portion 5. Of these, the disparity value deriving portion 3 includes an image acquiring portion 100, a conversion portion 200, and a disparity value arithmetic processing portion 300.

The image acquiring portion 100 is a functional portion that images a subject in the front with the two left and right cameras, generates respective analog image signals, and acquires two luminance images that are images based on respective image signals. The image acquiring portion 100 is realized by the imaging portion 10a and the imaging portion 10b illustrated in FIG. 6.

The conversion portion 200 is a functional portion that removes noise from image data of the two luminance images acquired by the image acquiring portion 100, converts the image data into image data of a digital format, and outputs the converted image data. Among the image data (hereinafter, simply referred to as the luminance images) of the two luminance images output by the conversion portion 200, image data captured by the right camera (imaging portion 10a) of the image acquiring portion 100 is used as the reference image Ia (hereinafter, simply referred to as the reference image Ia), and image data captured by the left camera (imaging portion 10b) is used as the compared image Ib (hereinafter, simply referred to as the compared image Ib). That is, based on the two luminance images output from the image acquiring portion 100, the conversion portion 200 outputs the reference image Ia and the compared image Ib. The conversion portion 200 is realized by the signal conversion portions 20a and 20b illustrated in FIG. 6.

The disparity value arithmetic processing portion 300 is a functional portion that derives, based on the reference image Ia and the compared image Ib received from the conversion portion 200, disparity value for respective pixels of the reference image Ia, and generates a disparity image in which the disparity values are made to correspond to respective pixels of the reference image Ia. The disparity value arithmetic processing portion 300 outputs the generated disparity image to the recognition processing portion 5. In this embodiment, since a disparity value can be treated equivalently to a distance value, the disparity image is described as an example of a distance image, but the distance image is not limited to this example. For example, a distance image may be generated by combination of distance information of millimetric wave radar or laser radar with a disparity image generated by a stereo camera.

The recognition processing portion 5 includes a clustering portion 400 (extracting unit), a rejection portion 500, and a tracking determining portion 550.

The clustering portion 400 is a functional portion that executes clustering processing of recognizing, based on the disparity image and the reference image Ia output from the disparity value deriving portion 3, objects, such as a human and a car, from the reference image Ia, and extracting recognized images including these objects. Details of the clustering processing will be described later. The clustering portion 400 is realized by the FPGA 51 illustrated in FIG. 6.

The clustering portion 400 may be realized by, instead of the FPGA 51 that is a hardware circuit, a program stored in the ROM 53 being executed by the CPU 52. Further, the target to be subjected to the clustering processing is not limited to the reference image Ia, and the target may be the compared image Ib.

Further, the reference image Ia may be a gray scale image, or an RGB color image or the like. If the reference image Ia is a color image, only particular components may be made the target of clustering processing, the clustering processing may be executed for each of the components, and lastly results of the clustering processing may be combined together. Further, the RGB format may be converted to a different color system, such as the YIQ format, and a particular component, such as a luminance component (Y channel) or the like may be made the target of clustering processing. Hereinafter, the reference image Ia will be described as being formed of, for example, pixels having 8-bit gray scale luminance values.

The rejection portion 500 is a functional portion that executes, based on the disparity image and the reference image Ia output from the disparity value deriving portion 3 and information (for example, coordinates indicating a position in the reference image Ia, a size, and the like) (hereinafter, simply referred to as "recognized image information") representing a recognized image output from the clustering portion 400, rejection determination processing for the recognized image represented by the recognized image information. The rejection determination processing will be described later.

The tracking determining portion 550 is a functional portion that determines, based on a result of the rejection determination processing from the rejection portion 500, whether or not tracking is to be executed on the object in the recognized image. For example, the tracking determining portion 550 determines that tracking is to be executed on the object not determined to be rejected by the rejection portion 500, and outputs recognition information including the recognized image information of the object and information indicating that tracking is to be executed, to the vehicle control device 6. The tracking determining portion 550 is realized by the FPGA 51 illustrated in FIG. 6.

The tracking determining portion 550 may be realized by, instead of the FPGA 51 that is a hardware circuit, a program stored in the ROM 53 being executed by the CPU 52.

Functions of the image acquiring portion 100, the conversion portion 200, and the disparity value arithmetic processing portion 300, of the disparity value deriving portion 3, as well as the clustering portion 400, the rejection portion 500, and the tracking determining portion 550, of the recognition processing portion 5, illustrated in FIG. 7, have been disclosed conceptually, and these portions are not limited to this configuration. For example, some of the functional portions illustrated as independent functional portions in the disparity value deriving portion 3 and the recognition processing portion 5 illustrated in FIG. 7 may be configured as a single functional portion. On the contrary, a function that any one of the functional portions in the disparity value deriving portion 3 and the recognition processing portion 5 illustrated in FIG. 7 has may be divided into plural functions, and be configured as plural functional portions.

As illustrated in FIG. 8, the disparity value arithmetic processing portion 300 includes a cost calculating portion 301, a determining portion 302, and a first generating portion 303 (second generating unit).

The cost calculating portion 301 is a functional portion that calculates the cost value C (p, d) of each candidate pixel q (x+d, y) that is a candidate for a corresponding pixel, based on a luminance value of the reference pixel p (x, y) in the reference image Ia and a luminance value of the candidate pixel q (x+d, y) identified by shifting by the shift amount d from a pixel corresponding to a position of the reference pixel p (x, y) on the epipolar line EL in the compared image Ib based on the reference pixel p (x, y). Specifically, by block matching processing, the cost calculating portion 301 calculates, as the cost value C, a non-similarity between the reference area pb, which is a predetermined area around the reference pixel p of the reference image Ia, and the candidate area qb (having the same size as the reference area pb) around the candidate pixel q of the compared image Ib.

The determining portion 302 is a functional portion that determines a disparity value dp for a pixel of the reference image Ia subjected to the calculation of the cost value C, the disparity value dp being the shift amount d corresponding to the minimum value of the cost values C calculated by the cost calculating portion 301.

The first generating portion 303 is a functional portion that generates, based on the disparity values dp determined by the determining portion 302, a disparity image that is an image having disparity values dp corresponding to pixels of the reference image Ia and representing luminance values of those pixels.

Each of the cost calculating portion 301, the determining portion 302, and the first generating portion 303, illustrated in FIG. 8, is realized by the FPGA 31 illustrated in FIG. 6. A part or all of the cost calculating portion 301, the determining portion 302, and the first generating portion 303 may be realized by, instead of the FPGA 31 that is a hardware circuit, a program stored in the ROM 33 being executed by the CPU 32.

Functions of the cost calculating portion 301, the determining portion 302, and the first generating portion 303, of the disparity value arithmetic processing portion 300 illustrated in FIG. 8 have been disclosed conceptually, but these portions are not limited to this configuration. For example, some of the functional portions illustrated as independent functional portions in the disparity value arithmetic processing portion 300 illustrated in FIG. 8 may be configured as a single functional portion. On the contrary, a function that any one of the functional portions in the disparity value arithmetic processing portion 300 illustrated in FIG. 8 has may be divided into plural functions and be configured as plural functional portions.

As illustrated in FIG. 9, the rejection portion 500 includes an input portion 501 (input unit), a second generating portion 502 (first generating unit), a surface processing portion 503, a rejection determining portion 504 (determining unit), and an output portion 505 (output unit).

The input portion 501 is a functional portion that receives the reference image Ia and the disparity image output from the disparity value deriving portion 3, as well as the recognized image information output from the clustering portion 400. The input portion 501 sends input information that is the reference image Ia, the disparity image, and the recognized image information, to the second generating portion 502. The input portion 501 does not necessarily receive the reference image Ia, the disparity image, and the recognized image information from the disparity value deriving portion 3 and the clustering portion 400, and may, for example, read out and receive the reference image Ia, the disparity image, and the recognized image information stored in: a storage medium, such as the RAM 34 or the RAM 54 illustrated in FIG. 6, a compact disc (CD), a digital versatile disc (DVD), or a hard disk drive (HDD); or a network storage. Further, instead of receiving the recognized image information, the input portion 501 may receive the recognized image itself from the clustering portion 400.

The second generating portion 502 is a functional portion that generates, from the disparity image in the input information (the reference image Ia, the disparity image, and the recognized image information) received from the input portion 501, a later described bird's-eye view image (frequency image) that is an example of a U-Disparity map illustrated in FIGS. 16A and 16B. The U-Disparity map is a two-dimensional histogram having, as a horizontal axis thereof, an x-axis of the reference image Ia (or actual distance in a direction from the imaging portion 10b (left camera) to the imaging portion 10a (right camera), and as a vertical axis thereof, the disparity value dp of the disparity image (or distance in a depth direction converted from the disparity value dp). The second generating portion 502 sends the generated bird's-eye view image, and the reference image Ia and recognized image information received from the input portion 501, to the surface processing portion 503.

The surface processing portion 503 is a functional portion that executes later described surface detection and surface angle calculation processing (which may, hereinafter, simply be referred to as "surface processing") on an image (hereinafter, referred to as "corresponding recognized image") on the bird's-eye view image, the image corresponding to the recognized image on the reference image Ia represented by the recognized image information. The surface processing portion 503 sends processing results of the surface processing to the rejection determining portion 504. The surface processing portion 503 includes, as illustrated in FIG. 9, a surface detecting portion 503a (detecting unit) and a surface angle calculating portion 503b (calculating unit).

The surface detecting portion 503a is a functional portion that detects a surface of the object represented by the corresponding recognized image. A later described corner detection method is used for execution of a method of detecting a surface of the object represented by the corresponding recognized image. The surface detecting portion 503a sends information on the detected surface of the object of the corresponding recognized image, to the surface angle calculating portion 503b.

The surface angle calculating portion 503b is a functional portion that calculates, based on the information on the surface received from the surface detecting portion 503a, an angle of the surface of the object of the corresponding recognized image, with respect to a line segment joining the centers of the lenses (imaging lenses 11a and 11b) of both of the cameras (imaging portions 10a and 10b) of the object recognition device 1. For example, the surface angle calculating portion 503b sets a direction (reference direction) from the imaging portion 10b (left camera) to the imaging portion 10a (right camera), to zero degrees to calculate the above mentioned angle of the surface of the object. The surface angle calculating portion 503b sends processing results, which include: information on the surface of the object of the corresponding recognized image and on the surface angle; and the reference image Ia, the recognized image information, and the like, to the rejection determining portion 504.

The rejection determining portion 504 is a functional portion that determines, based on the processing results output from the surface processing portion 503, whether or not the recognized image on the reference image Ia represented by the recognized image information included in the processing results is to be rejected. The rejection determining portion 504 outputs a result of the rejection determination, to the output portion 505.

The output portion 505 includes the result of the rejection determination output from the rejection determining portion 504, that is, a rejection flag indicating whether or not the recognized image is to be rejected, in the recognized image information, and sends the recognized image information including the rejection flag, to the tracking determining portion 550. This recognized image information including the rejection flag is illustrated as recognition information of the recognition processing portion 5 in FIG. 7. If the recognized image is to be rejected, the rejection flag of that recognized image is turned ON, and if the recognized image is not to be rejected, the rejection flag of that recognized image is turned OFF.

The "image processing device" according to the present invention may be the rejection portion 500, or the recognition processing portion 5 including the rejection portion 500.

Each of the input portion 501, the second generating portion 502, the surface processing portion 503, the rejection determining portion 504, and the output portion 505, illustrated in FIG. 9, is realized by the FPGA 51 illustrated in FIG. 6. A part or all of the input portion 501, the second generating portion 502, the surface processing portion 503, the rejection determining portion 504, and the output portion 505 may be realized by, instead of the FPGA 51 that is a hardware circuit, a program stored in the ROM 53 being executed by the CPU 52.

Functions of the input portion 501, the second generating portion 502, the surface processing portion 503, the rejection determining portion 504, and the output portion 505, of the rejection portion 500 illustrated in FIG. 9 have been disclosed conceptually, and these portions are not limited to this configuration. For example, some of the functional portions illustrated as independent functional portions in the rejection portion 500 illustrated in FIG. 9 may be configured as a single functional portion. On the contrary, a function that any one of the functional portions in the rejection portion 500 illustrated in FIG. 9 has may be divided into plural functions and be configured as plural functional portions.

(Block Matching Processing of Disparity Value Deriving Portion)

Figure 10:
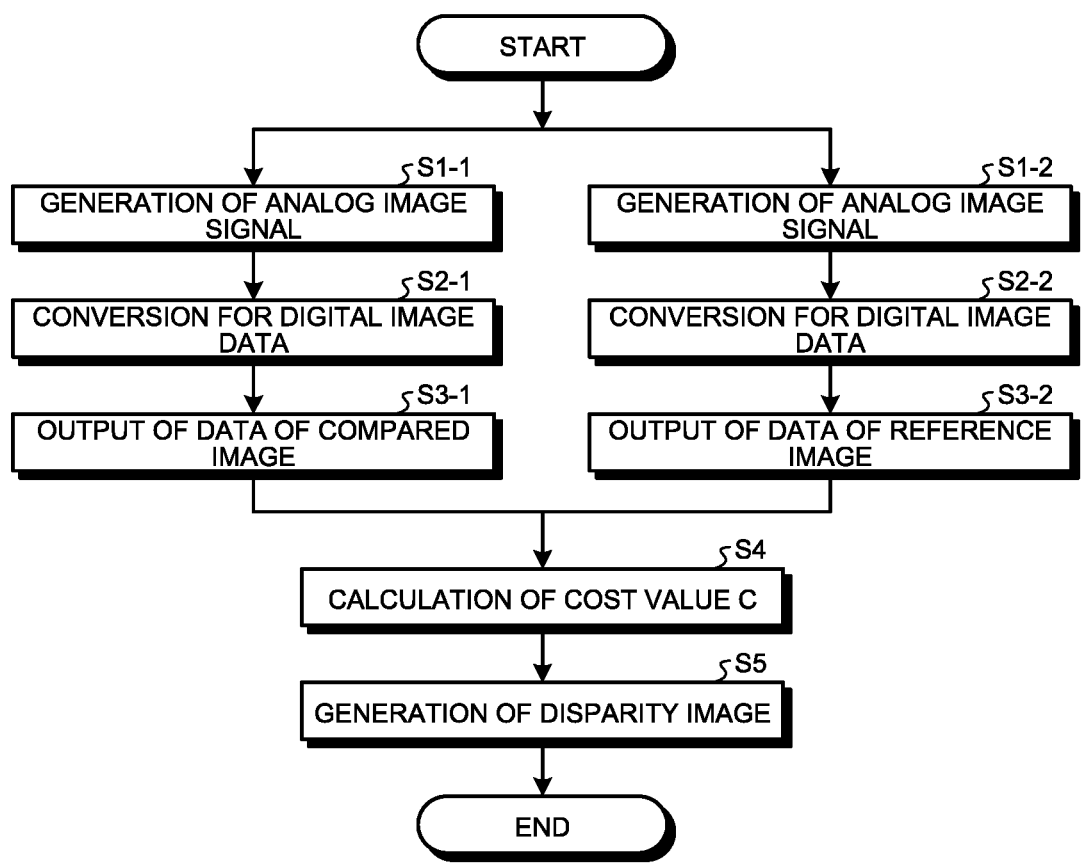
FIG. 10 is a flow chart illustrating an example of operation of block matching processing of a disparity value deriving portion according to the first embodiment.

FIG. 10 is a flow chart illustrating an example of operation of the block matching processing of the disparity value deriving portion according to the first embodiment. While reference is made to FIG. 10, a flow of the operation of the block matching processing of the disparity value deriving portion 3 of the object recognition device 1 will be described.

<Step S1-1>

The image acquiring portion 100 of the disparity value deriving portion 3 images a subject in the front with the left camera (imaging portion 10b), generates an analog image signal, and acquires a luminance image that is an image based on that image signal. Thereby, an image signal to be subjected to later stage image processing is acquired. The processing is then advanced to Step S2-1.

<Step S1-2>

The image acquiring portion 100 of the disparity value deriving portion 3 images the subject in the front with the right camera (imaging portion 10a), generates an analog image signal, and acquires a luminance image that is an image based on that image signal. Thereby, an image signal to be subjected to the later stage image processing is acquired. The processing is then advanced to Step S2-2.

<Step S2-1>

The conversion portion 200 of the disparity value deriving portion 3 removes noise from the analog image signal acquired through the imaging by the imaging portion 10b, and converts the image signal into image data of a digital format. By this conversion into the image data of the digital format, image processing per pixel on the image based on the image data is enabled. The processing is then advanced to Step S3-1.

<Step S2-2>

The conversion portion 200 of the disparity value deriving portion 3 removes noise from the analog image signal acquired through the imaging by the imaging portion 10a, and converts the image signal into image data of a digital format. By this conversion into the image data of the digital format, image processing per pixel on the image based on the image data is enabled. The processing is then advanced to Step S3-2.

<Step S3-1>

The conversion portion 200 outputs the image based on the image data of the digital format converted in Step S2-1, as a compared image Ib for block matching processing. Thereby, an image serving as a target to be compared for finding disparity values dp in the block matching processing is acquired. The processing is then advanced to Step S4.

<Step S3-2>

The conversion portion 200 outputs the image based on the image data of the digital format converted in Step S2-2, as a reference image Ia for the block matching processing. Thereby, an image serving as a reference for finding the disparity values dp in the block matching processing is acquired. The processing is then advanced to Step S4.

<Step S4>

The cost calculating portion 301 of the disparity value arithmetic processing portion 300 of the disparity value deriving portion 3 executes calculation to acquire a cost value C (p, d) of each candidate pixel q (x+d, y) for a corresponding pixel, based on: a luminance value of a reference pixel p (x, y) in the reference image Ia; and a luminance value of the candidate pixel q (x+d, y) identified by shifting by a shift amount d from a pixel corresponding to a position of the reference pixel p (x, y) on an epipolar line EL in the compared image Ib based on the reference pixel p (x, y). Specifically, by block matching processing, the cost calculating portion 301 calculates, as a cost value C, a non-similarity between a reference area pb that is a predetermined area around the reference pixel p in the reference image Ia, and a candidate area qb (having the same size as the reference area pb) around the candidate pixel q of the compared image Ib. The processing is then advanced to Step S5.

<Step S5>

The determining portion 302 of the disparity value arithmetic processing portion 300 of the disparity value deriving portion 3 determines a disparity value dp for the pixel in the reference image Ia subjected to the calculation of the cost value C, the disparity value dp being the shift amount d corresponding to the minimum value of the cost values C calculated by the cost calculating portion 301. The first generating portion 303 of the disparity value arithmetic processing portion 300 of the disparity value deriving portion 3 generates, based on the disparity values dp determined by the determining portion 302, a disparity image that is an image having disparity values dp corresponding to pixels of the reference image Ia and representing luminance values of those pixels. The generating portion 303 outputs the generated disparity image to the recognition processing portion 5.

The block matching processing has been described above as an example of the stereo matching processing, but the stereo matching processing is not limited to this example, and may be processing using the Semi-Global Matching (SGM) method.

(Clustering Processing of Recognition Processing Portion)

Figure 11:
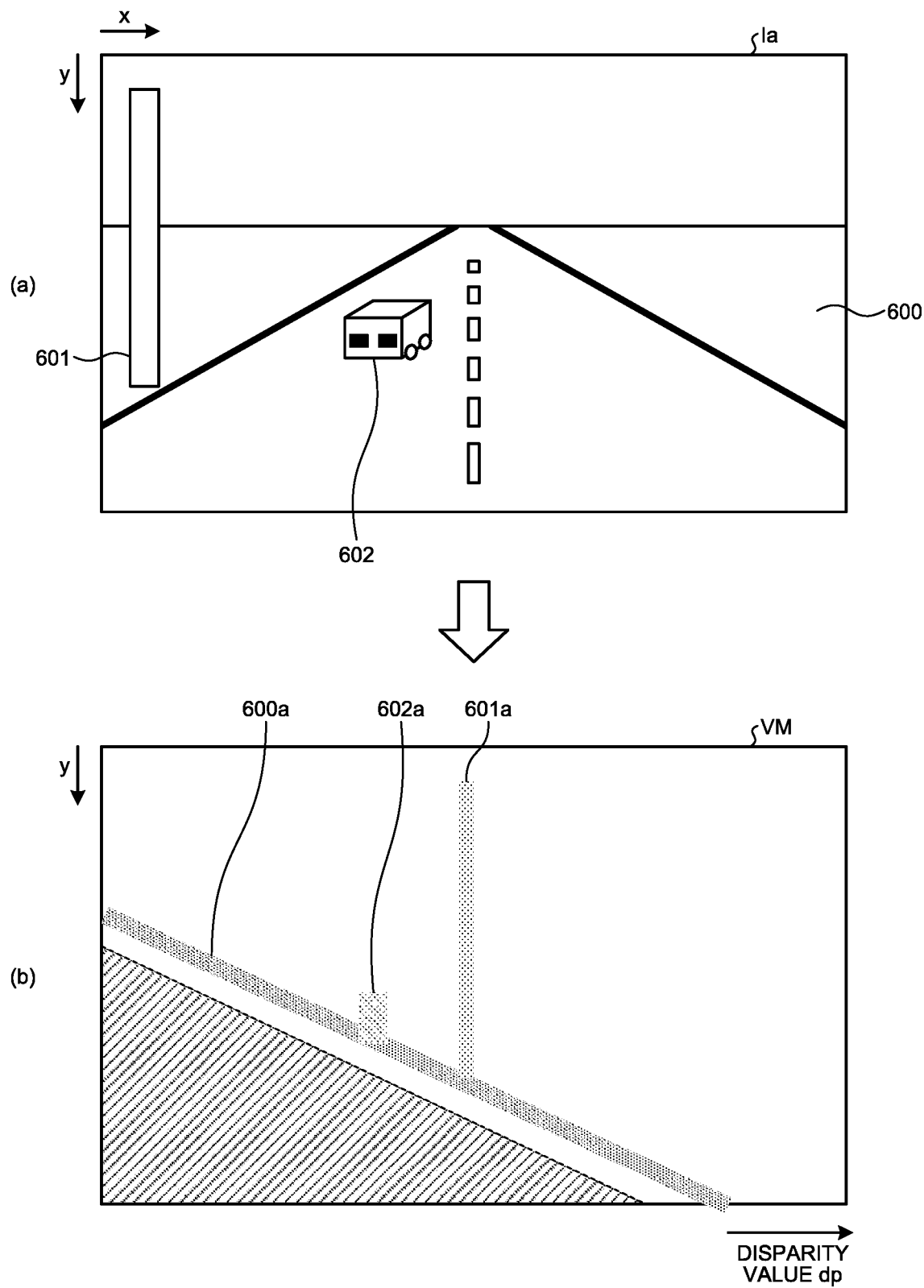
FIG. 11 is a diagram for explanation of operation of clustering processing of a clustering portion of a recognition processing portion according to the first embodiment.
Figure 12:
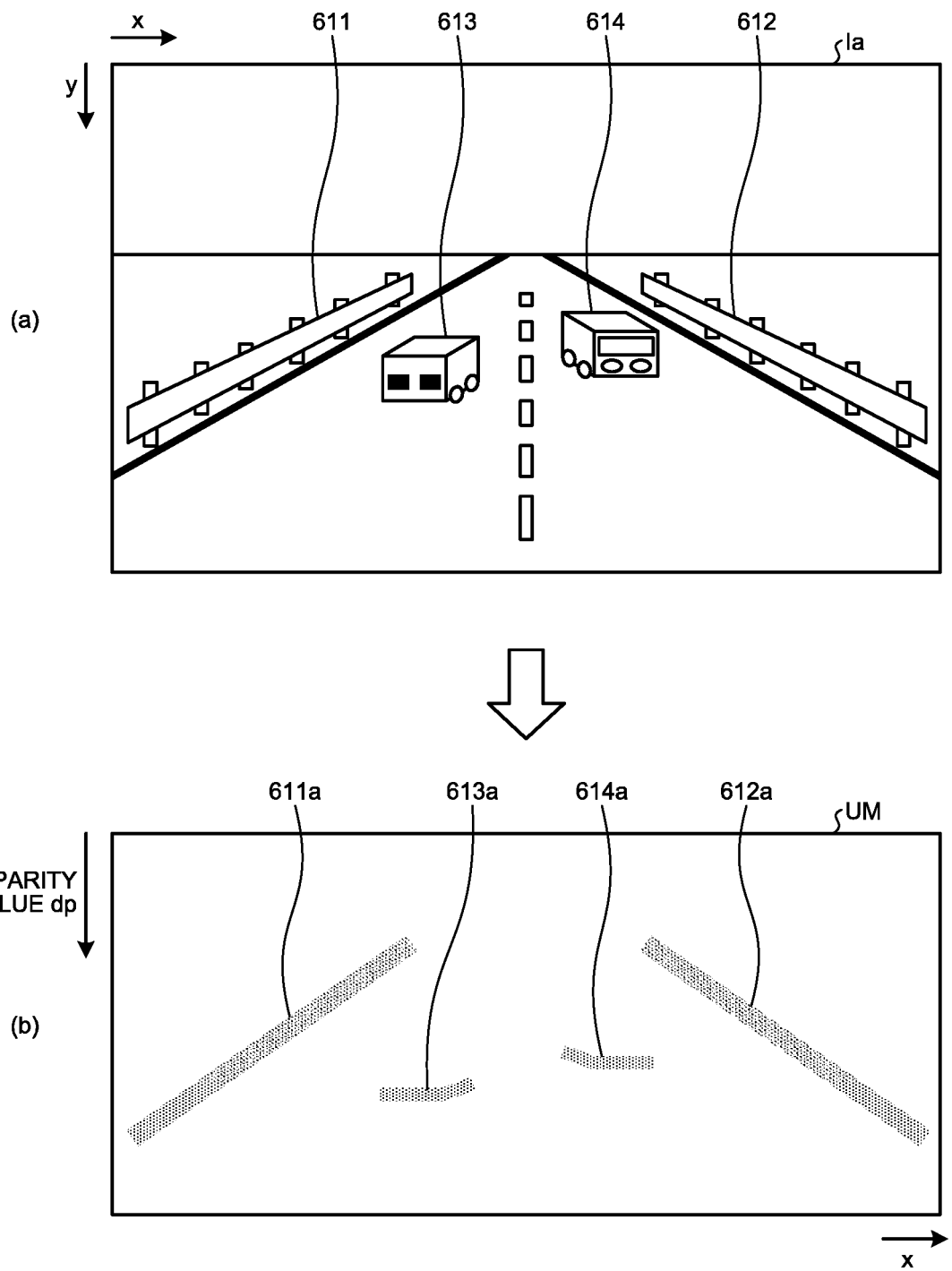
FIG. 12 is a diagram for explanation of the operation of the clustering processing of the clustering portion of the recognition processing portion according to the first embodiment.
Figure 13A:
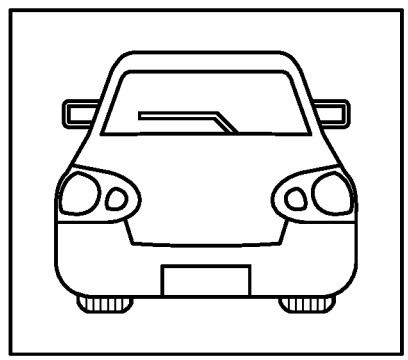
FIGS. 13A to 13C are diagrams illustrating examples of recognized images extracted by the clustering processing.
Figure 13B:
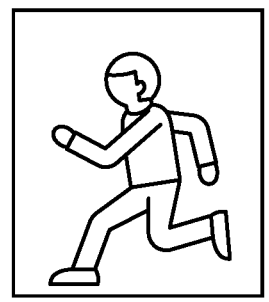
Figure 13C:
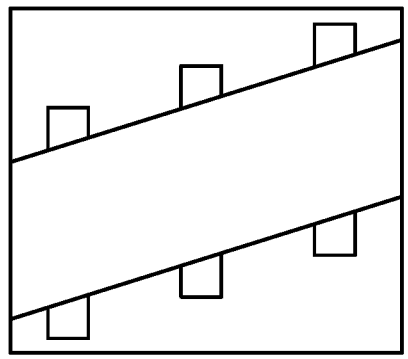

FIG. 11 is a diagram for explanation of operation of the clustering processing of the clustering portion of the recognition processing portion according to the first embodiment. FIG. 12 is a diagram for explanation of the operation of the clustering processing of the clustering portion of the recognition processing portion according to the first embodiment. FIGS. 13A to 13C are diagrams illustrating examples of recognized images extracted by the clustering processing. While reference is made to FIG. 11 to FIG. 13C, the operation of the clustering processing in the clustering portion 400 of the recognition processing portion 5 will be described.

The clustering portion 400 firstly receives a disparity image output from the disparity value deriving portion 3 and a reference image Ia (for example, a reference image Ia illustrated at (a) in FIG. 11 or a reference image Ia illustrated at (a) in FIG. 12). The reference image Ia illustrated at (a) in FIG. 11 includes, for example, a road surface 600, a utility pole 601, and a car 602, captured therein. The clustering portion 400 executes clustering processing of generating a V-map VM that is a V-Disparity map illustrated at (b) in FIG. 11, in order to detect a road surface from the reference image Ia. The V-Disparity map is a two-dimensional histogram having the y-axis of the reference image Ia as a vertical axis thereof, and disparity value dp of the disparity image as a horizontal axis thereof. The road surface 600 in the reference image Ia illustrated at (a) in FIG. 11 corresponds to a road surface portion 600a in the V-map VM, and the utility pole 601 corresponds to a utility pole portion 601a therein, and the car 602 corresponds to a car portion 602a therein.

From the generated V-map VM, the clustering portion 400 executes linear approximation for position presumed to be the road surface. If the road surface is flat, approximation is possible with a single straight line, but if the road surface changes in gradient, linear approximation needs to be executed accurately by division of the interval on the V-map VM. A known technique, such as the Hough transform or the least squares method, may be used as the linear approximation. On the V-map VM, the utility pole portion 601a and the car portion 602a that are lumps positioned above the detected road surface portion 600a correspond to the utility pole 601 and the car 602, respectively, that are objects on the road surface. When generating a later described U-Disparity map, the clustering portion 400 uses only the information above the road surface for noise removal.

Next, the clustering portion 400 executes clustering processing of generating a U-map UM, which is a U-Disparity map illustrated at (b) in FIG. 12, in order to estimate presence of any objects, such as a guard rail, a wall, and a car, using only information positioned above the road surface detected in a V-map VM, that is, using information on a left guard rail 611, a right guard rail 612, a car 613, and a car 614, in the reference image Ia illustrated at (a) in FIG. 12. The U-Disparity map is as described above, and the U-map UM illustrated at (b) in FIG. 12 is a two-dimensional histogram having an x-axis of the reference image Ia as a horizontal axis thereof, and the disparity value dp of the disparity image as a vertical axis thereof. The left guard rail 611 in the reference image Ia illustrated at (a) in FIG. 12 corresponds to a left guard rail portion 611*a* in the U-map UM, the right guard rail 612 corresponds to a right guard rail portion 612*a* therein, the car 613 corresponds to a car portion 613*a* therein, and the car 614 corresponds to a car portion 614*a* therein.

Further, the clustering portion 400 is able to execute, as clustering processing, identification of positions and widths (xmin, xmax) of the objects in the x-axis direction in the disparity image and the reference image Ia, from the generated U-map UM. Furthermore, the clustering portion 400 is able to identify actual depths of the objects, from information (dmin, dmax) on heights of the objects on the generated U-map UM. Moreover, the clustering portion 400 is able to identify, from the generated V-map VM, positions and heights of the objects in the y-axis direction in the disparity image and the reference image Ia (ymin="y-coordinate corresponding to maximum height of maximum disparity value from road surface", and ymax="y-coordinate indicating height of road surface obtained from maximum disparity value"). In addition, the clustering portion 400 is able to identify, from the widths (xmin, xmax) of the objects in the x-axis direction identified in the disparity image, the heights (ymin, ymax) thereof in the y-axis direction, and the disparity values dp corresponding thereto, actual sizes of the objects in the x-axis direction and y-axis direction. As described above, the clustering portion 400 is able to identify the positions, as well as the actual widths, heights, and depths, of the objects in the reference image Ia, using the V-map VM and the U-map UM. Further, since the positions of the objects in the reference image Ia are identified, the positions in the disparity image are also determined, and the clustering portion 400 is thus able to also identify distances to the objects.

The clustering portion 400 is able to execute, as clustering processing, identification of what the objects are, from the actual sizes (widths, heights, and depths) identified for the objects, using Table 1 below. For example, if an object has a width of 900 [mm], a height of 1800 [mm], and a depth of 500 [mm], the object is able to be identified as a "pedestrian". Information associating widths, heights, and depths as listed in Table 1 with types of objects (object types) may be stored as a table in the RAM 54 or the like. However, the identification of the type of an object from Table 1 is just identification from the size of the object in the recognized image extracted in clustering processing, and for accurate recognition of whether or not the recognized image actually represents, for example, a vehicle, processing by another algorithm is needed.

TABLE 1

| Object type | Width [mm] | Height [mm] | Depth [mm] |
| --- | --- | --- | --- |
| Motorcycle or bicycle | <1100 | <2500 | >1000 |
| Pedestrian | <1100 | <2500 | ≤1000 |
| Compact car | <1700 | <1700 | <10000 |
| Standard-sized car | <1700 | <2500 | <10000 |
| Truck | <3500 | <3500 | <15000 |
| Other | Not applicable to any of above sizes | | |

The clustering portion 400 executes clustering processing of generating recognized image information, which is information including: the actual size (width, height, and depth) of an identified object, the type of the object; and a position (for example, the top left coordinates), a width, a height, and the like, of the rectangular recognized image including the identified object in the reference image Ia, and outputs the generated recognized image information to the rejection portion 500. The recognized image is not limited to being rectangular, and may be circular, elliptical, polygonal, or the like.

As described above, the clustering processing by the clustering portion 400 is processing of identifying (recognizing) captured objects from a reference image Ia and extracting recognized images that are images including these objects. Examples of the recognized images extracted through the clustering processing by the clustering portion 400 are illustrated in FIGS. 13A to 13C. FIG. 13A is an example of a recognized image of a vehicle, FIG. 13B is an example of a recognized image of a human, and FIG. 13C is an example of a recognized image of a guard rail (an example of a side wall object) placed along sides of a road.

Like FIG. 13A and FIG. 13B, recognized images of a human and another vehicle (recognized images that have been correctly recognized) are recognized images to be used for automatic control (tracking control or the like) of the vehicle, and thus should not be rejected, as these recognized images are to be made a target of the automatic control in the vehicle control device 6. The recognized image of the side wall object illustrated in FIG. 13C is rejected, in this embodiment, as being a recognized image not to be used in the automatic control of the vehicle. Such rejection determination processing of determining whether or not a recognized image is of a side wall object not to be used in the automatic control and rejecting the recognized image if the recognized image represents a side wall object will be described with reference to FIG. 14 to FIG. 21 next.

The processing described with reference to FIG. 11 and FIG. 12 is an example of the clustering processing, and the clustering processing may be any clustering processing as long as the clustering processing is processing enabling recognized images including objects to be extracted from a reference image.

(Rejection Determination Processing of Rejection Portion)

Figure 14:
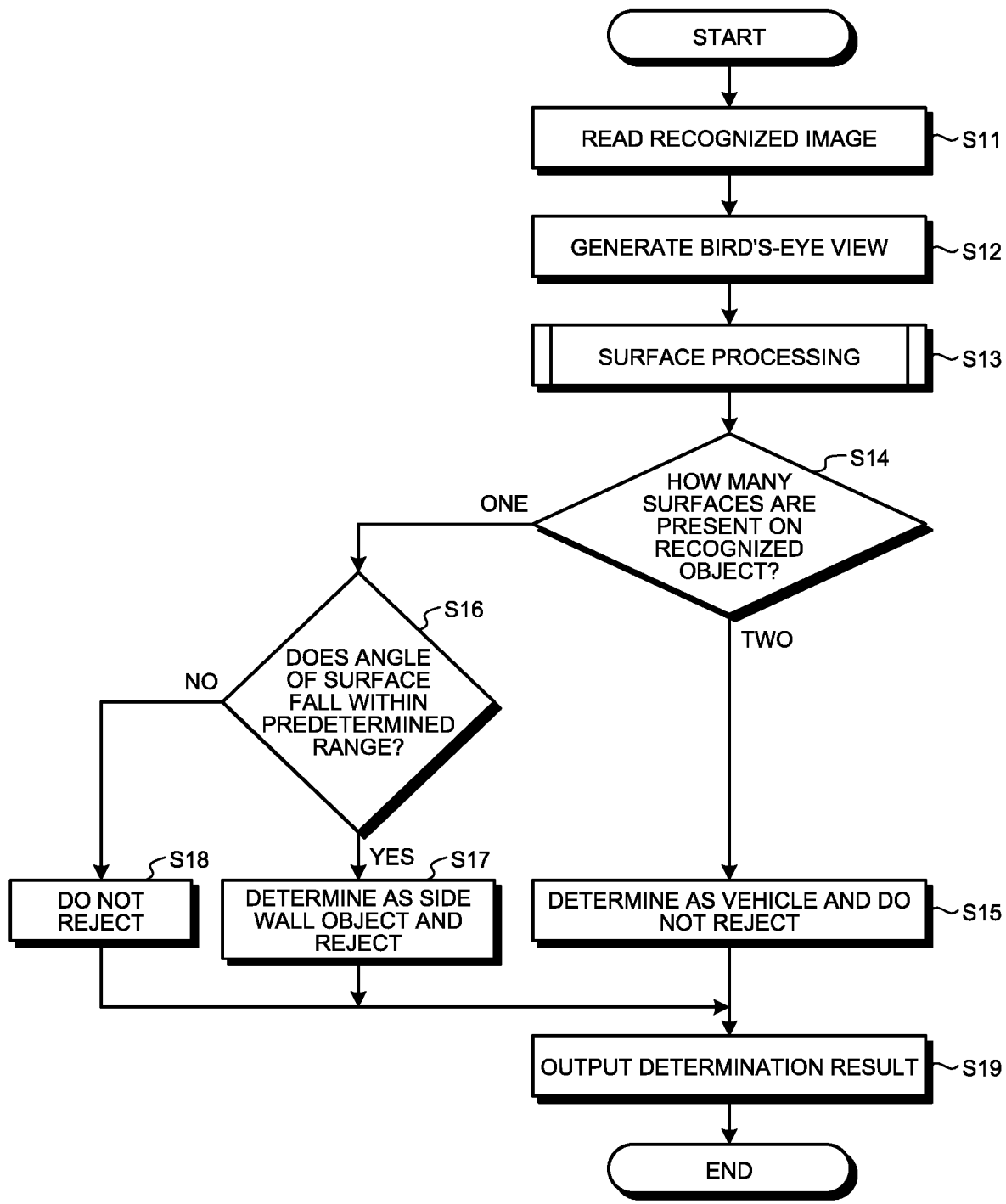
FIG. 14 is a flow chart illustrating an example of operation of rejection determination processing of the rejection portion of the recognition processing portion according to the first embodiment.
Figure 15:
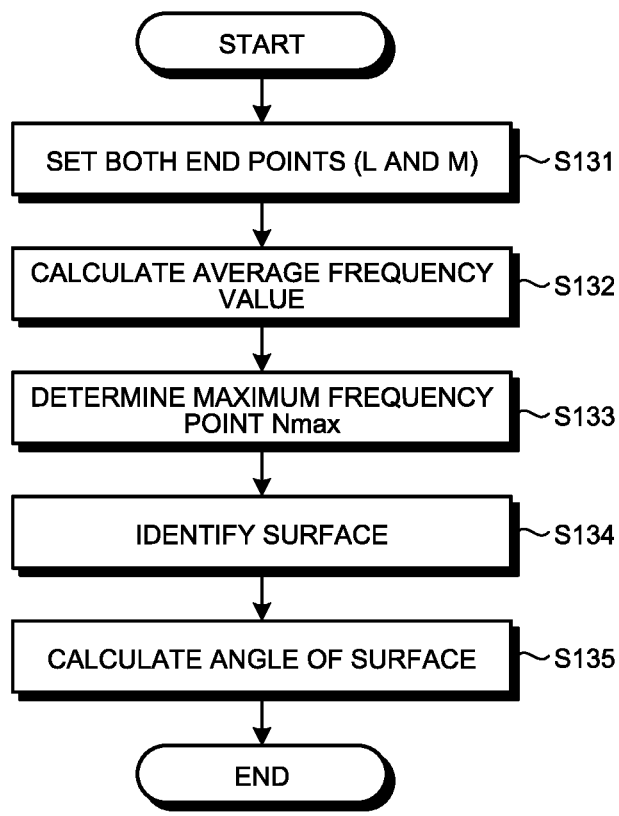
FIG. 15 is a flow chart illustrating an example of operation of surface detection and surface angle calculation processing of the rejection portion of the recognition processing portion according to the first embodiment.
Figure 17A:
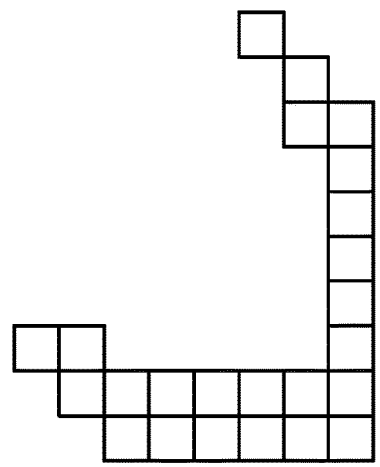
FIGS. 17A to 17C are diagrams illustrating examples of corresponding recognized images in the bird's-eye view image.
Figure 17B:
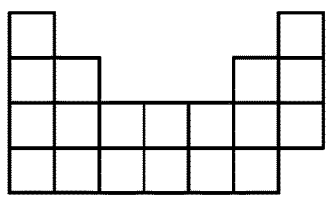
Figure 17C:
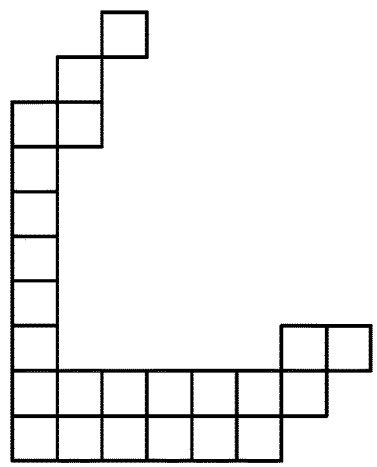
Figure 18A:
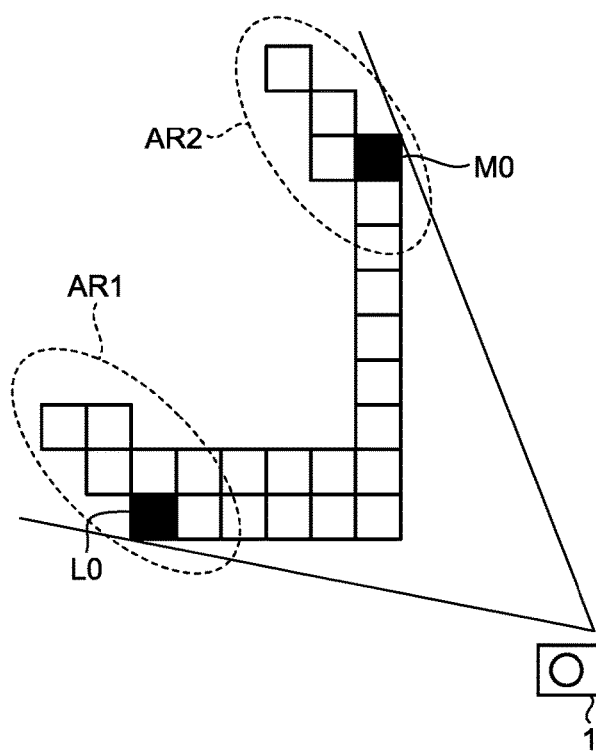
FIGS. 18A and 18B are diagrams for explanation of corner detection for a corresponding recognized image.
Figure 18B:
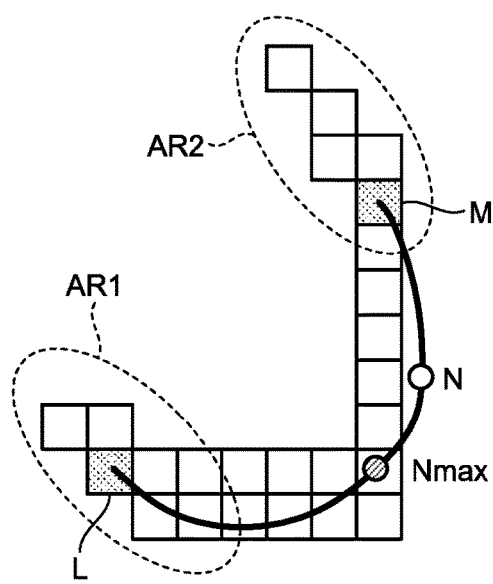
Figure 19A:
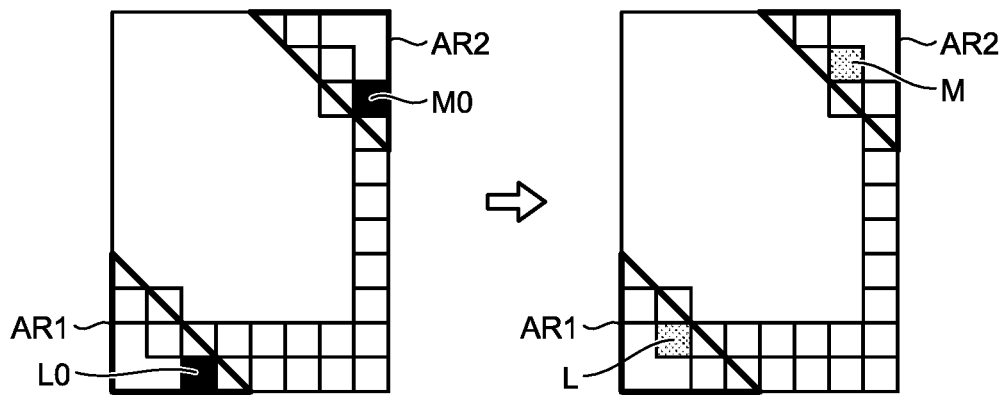
FIGS. 19A to 19C are diagrams for explanation of areas where end points are searched for in the corner detection on the corresponding recognized image.
Figure 19B:
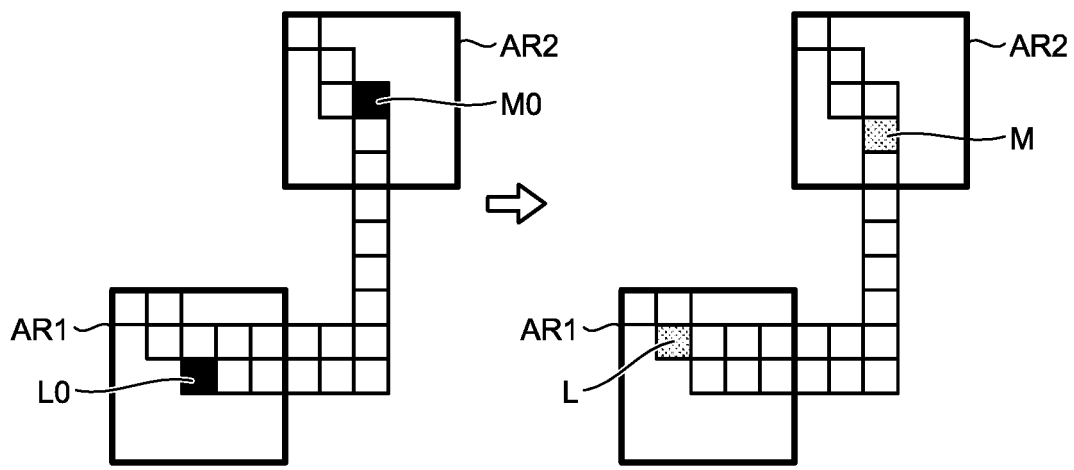
Figure 19C:
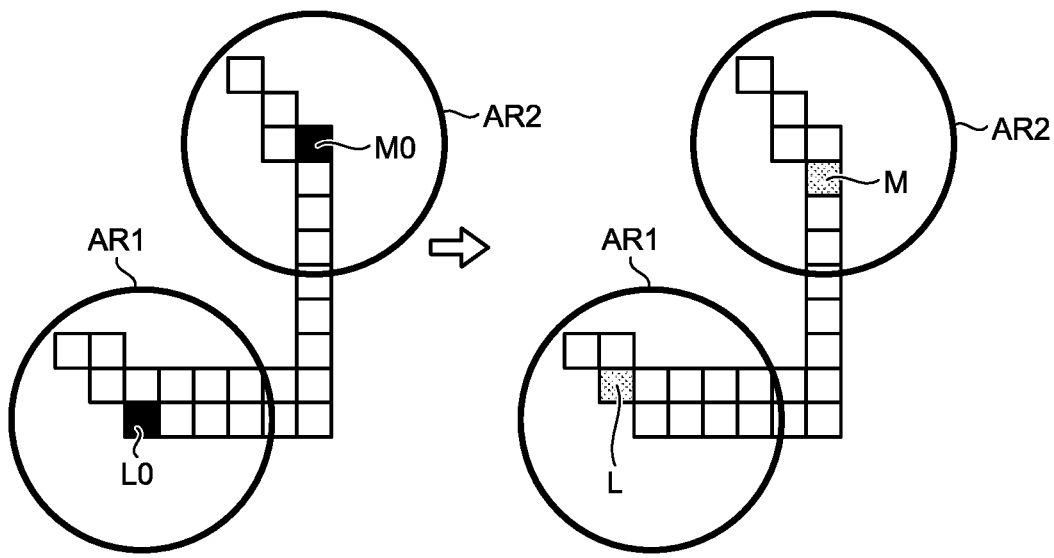
Figure 20:
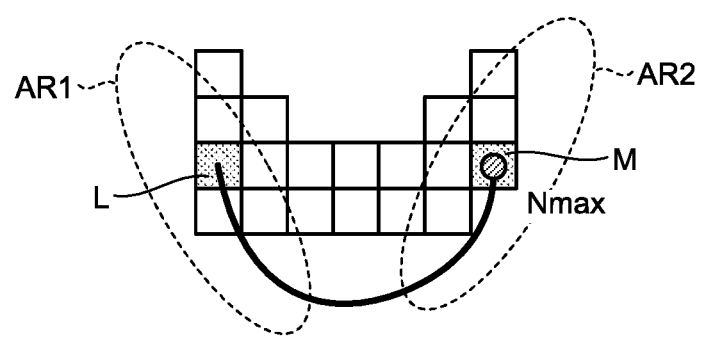
FIG. 20 is a diagram for explanation of corner detection for a corresponding recognized image.
Figure 21:
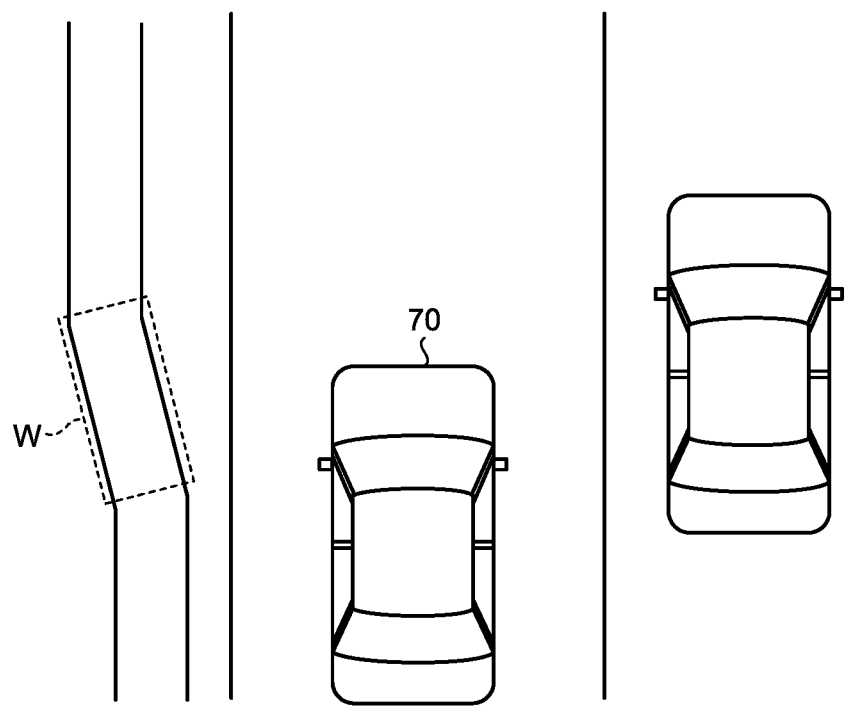
FIG. 21 is a diagram for explanation of a side wall object that is in a direction deviated from a traveling direction of a vehicle.

FIG. 14 is a flow chart illustrating an example of operation of the rejection determination processing of the rejection portion of the recognition processing portion according to the first embodiment. FIG. 15 is a flow chart illustrating an example of operation of the surface detection and surface angle calculation processing of the rejection portion of the recognition processing portion according to the first embodiment. FIGS. 16A and 16B are diagrams illustrating an example of a bird's-eye view image. FIGS. 17A to 17C are diagrams illustrating examples of corresponding recognized images in the bird's-eye view image. FIGS. 18A and 18B are diagrams illustrating corner detection on a corresponding recognized image. FIGS. 19A to 19C are diagrams for explanation of areas where end points are searched for in the corner detection on the corresponding recognized image. FIG. 20 is a diagram for explanation of corner detection on a corresponding recognized image. FIG. 21 is a diagram for explanation of a side wall object that is in a direction deviated from the traveling direction of the vehicle. While reference is made to FIG. 14 to FIG. 21, a flow of an example of the operation of the rejection determination processing of the rejection portion 500 of the recognition processing portion 5 will be described.

<Step S11>

The input portion 501 receives a reference image Ia and a disparity image output from the disparity value deriving portion 3, as well as recognized image information output from the clustering portion 400. The input portion 501 sends, as input information, the reference image Ia, the disparity image, and the recognized image information, to the second generating portion 502. The processing is then advanced to Step S12.

<Step S12>

Figure 16A:
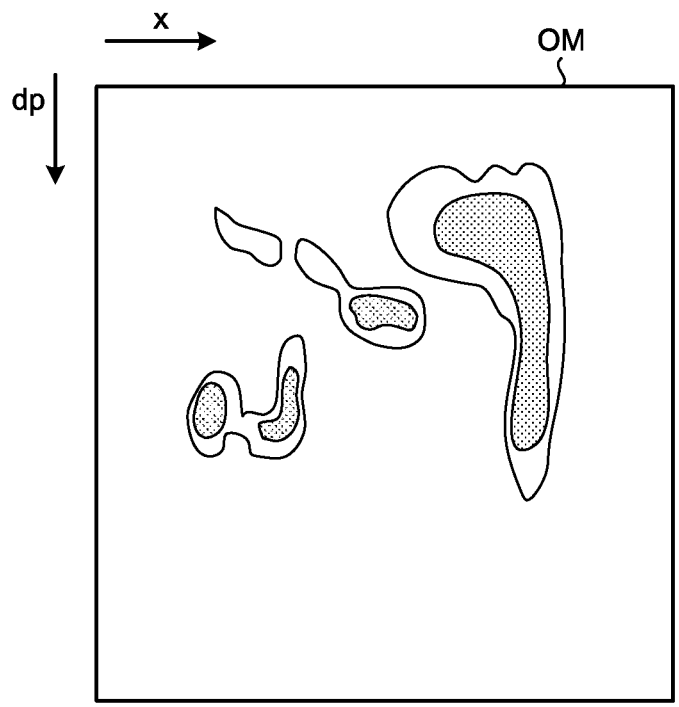
FIGS. 16A and 16B are diagrams illustrating an example of a bird's-eye view image.
Figure 16B:
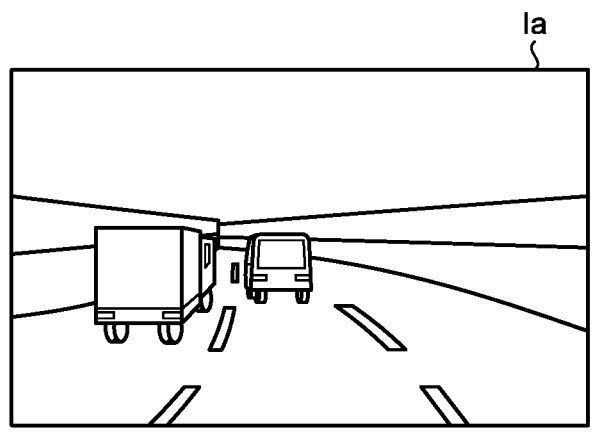

The second generating portion 502 generates, from the disparity image in the input information (the reference image Ia, the disparity image, and the recognized image information) received from the input portion 501, a bird's-eye view image OM illustrated as an example of a U-Disparity map in FIG. 16A.

The bird's-eye view image OM illustrated in FIG. 16A is an example of a U-Disparity map that is a two-dimensional histogram having, as a horizontal axis thereof, actual distance in a direction from the imaging portion 10b (left camera) to the imaging portion 10a (right camera), and as a vertical axis thereof, disparity value dp of the disparity image (or distance in a depth direction converted from the disparity value dp). A bird's-eye view image corresponding to a reference image Ia illustrated in FIG. 16B is the bird's-eye view image OM illustrated in FIG. 16A, and for example, since a side wall object (a side wall of an expressway) captured in the reference image Ia extends in the traveling direction of the running vehicle, on the bird's-eye view image OM, highly frequent disparity values collect together long in a vertical direction in a paper-planar view in FIG. 16A.

The second generating portion 502 sends the generated bird's-eye view image, and the reference image Ia and the recognized image information received from the input portion 501, to the surface processing portion 503. The processing is then advanced to Step S13.

<Step S13>

The surface processing portion 503 identifies corresponding recognized images corresponding to recognized images on the reference image Ia represented by the recognized image information, on the bird's-eye view image. The surface processing portion 503 executes, with respect to the corresponding recognized images on the bird's-eye view image, surface detection and surface angle calculation processing (surface processing) illustrated as Step S131 to Step S135 in FIG. 15, in which the corner detection method is used. In FIGS. 17A to 17C, examples of the corresponding recognized images on the bird's-eye view image corresponding to the recognized images on the reference image Ia represented by the recognized image information are illustrated. FIG. 17A illustrates an example of a corresponding recognized image of a preceding car on the left with respect to the traveling direction of the own car (vehicle 70), FIG. 17B illustrates an example of a corresponding recognized image of a preceding car in the front with respect to the traveling direction of the own car, and FIG. 17C illustrates an example of a corresponding recognized image of a preceding car on the right with respect to the traveling direction of the own car. In the following description, as surface processing on a corresponding recognized image, surface processing on the corresponding recognized image of the left preceding car illustrated in FIG. 17A will be described.

<<Step S131>>

The surface detecting portion 503a of the surface processing portion 503 sets, as illustrated in FIG. 18A, a pixel (first pixel) of an end point M0 where a straight line representing a viewing angle direction contacts the corresponding recognized image, when increasing, at the position of the object recognition device 1 on the bird's-eye view image, the viewing angle from an angle (0 degrees) of the above described reference direction, for the corresponding recognized image on the bird's-eye view image illustrated in FIG. 18A. Further, the surface detecting portion 503a sets, as illustrated in FIG. 18A, a pixel (second pixel) of an end point L0 where a straight line representing a viewing angle direction contacts the corresponding recognized image at a side different from the end point M0, when increasing the viewing angle further from the viewing angle of the end point M0.

Next, the surface detecting portion 503a identifies a pixel having the maximum frequency as a pixel value thereof, from pixels included in a predetermined area AR2 including the end point M0, and determines this pixel as an end point M (second pixel). Further, the surface detecting portion 503a identifies a pixel having the maximum frequency as a pixel value thereof, from pixels included in a predetermined area AR1 including the end point L0, and determines this pixel as an end point L (second pixel). In the above described method of identifying the pixels, a pixel having, instead of the maximum frequency, a large total of frequencies of that target pixel and pixels adjacent to the target pixel may be selected, and basically, any method may be used as long as the method enables identification of a pixel that is not noise and that is a part of the object.

Examples of the method of setting the above described areas AR1 and AR2 are illustrated in FIGS. 19A to 19C. FIG. 19A illustrates a case where: a rectangular area circumscribing the corresponding recognized image is set; triangular areas each having the vertex at any of vertices at four corners of the rectangular area are set; the triangular area including the end point M0 is set as the area AR2; and the triangular area including the end point L0 is set as the area AR1. FIG. 19B illustrates a case where: rectangular areas each having, at the center, one of the end points M0 and L0 set in the corresponding recognized image are set; the rectangular area including the end point M0 is set as the area AR2; and the rectangular area including the end point L0 is set as the area AR1. FIG. 19C illustrates a case where: circular areas each having, at the center, one of the end points M0 and L0 set in the corresponding recognized image are set; the circular area including the end point M0 is set as the area AR2; and the circular area including the end point L0 is set as the area AR1. Any of FIGS. 19A to 19C may be used as an example of the setting of the areas AR1 and AR2. In the example of FIG. 19B, the areas AR1 and AR2 are square areas, but the areas AR1 and AR2 may be rectangular areas. Further, in the example of FIG. 19C, the areas AR1 and AR2 are circular areas, but the areas AR1 and AR2 may be elliptical areas.

Next, the surface detecting portion 503a sets, on the corresponding recognized image, a semicircle that passes the end points M and L and that is convexed toward the position of the object recognition device 1. That is, a line segment joining the end point M to the end point L is a diameter of the semicircle. Further, where an arbitrary point on this semicircle is a point N, an angle formed between a line segment LN and a line segment MN is a right angle. The processing is then advanced to Step S132.

<<Step S132>>

The surface detecting portion 503a calculates respective average values of frequencies of pixels on the corresponding recognized image that the line segment LN and the line segment MN pass through. The processing is then advanced to Step S133.

<<Step S133>>

The surface detecting portion 503a determines, as a maximum frequency point Nmax (third pixel), the point N having the maximum average value among the average values of frequencies calculated in Step S132. The surface detecting portion 503a detects (corner detection) this maximum frequency point Nmax as the position of a corner where a surface and a surface of the object represented by the corresponding recognized image intersect each other. The processing is then advanced to Step S134. The average value of frequencies is used above in the method of determining the maximum frequency point Nmax, but the method is not limited to this use, a total of frequencies may be used, and basically, any method may be used as long as the method enables determination of two line segments L-Nmax and M-Nmax including more disparity values in the bird's-eye view image.

<<Step S134>>

The surface detecting portion 503a detects a surface perpendicular to the road surface in the reference image Ia, the surface including, as the base or upper side, the line segment L-Nmax on the corresponding recognized image. The surface including this line segment L-Nmax as the base or upper side represents a rear surface of the left preceding car. Further, the surface detecting portion 503a detects a surface perpendicular to the road surface in the reference image Ia, the surface including, as the base or upper side, the line segment M-Nmax on the corresponding recognized image. The surface including this line segment M-Nmax as the base or upper side represents a right surface of the left preceding car. The surface detecting portion 503a sends information on the detected surfaces of the object in the corresponding recognized image (positions, lengths of the bottoms or upper sides, and the like, of the surfaces), to the surface angle calculating portion 503b. The processing is then advanced to Step S135.

<<Step S135>>

The surface angle calculating portion 503b calculates an angle (surface angle) of a surface detected by the surface detecting portion 503a, with respect to the above described reference direction. For example, a surface having a surface angle of 90 degrees calculated by the surface angle calculating portion 503b is a surface parallel to the traveling direction of the own car (vehicle 70) (for example, a surface of a side wall object, or a side surface of a preceding car), and a surface having a surface angle of 0 degrees (or 180 degrees) is a surface perpendicular to the traveling direction of the own car (for example, a rear surface of a preceding car). The surface angle calculating portion 503b outputs, to the rejection determining portion 504, processing results including: information on the surface and the surface angle of the object in the corresponding recognized image; the reference image Ia and the recognized image information; and the like.

By the above described processing from Step S131 to Step S135, the surfaces of the object represented by the recognized image are detected, and surface angles thereof are calculated. Further, when the surface processing portion 503 executes surface processing on the corresponding recognized image of the preceding car in the front with respect to the own car (vehicle 70) illustrated in FIG. 17B, as illustrated in FIG. 20, the maximum frequency point Nmax is highly likely to overlap with the end point M (or the end point L). In this case, the number of surfaces detected by the surface detecting portion 503a in the corresponding recognized image illustrated in FIG. 17B is one, and the surface angle calculated by the surface angle calculating portion 503b is 180 degrees. The processing is then advanced to Step S14.

<Step S14>

The rejection determining portion 504 determines, for an object represented by a recognized image (or a corresponding recognized image), how many surfaces have been detected by the surface detecting portion 503a. If the number of surfaces detected by the surface detecting portion 503a is one (Step S14: one), the processing is advanced to Step S16, and if the number of surfaces is two (Step S14: two), the processing is advanced to Step S15.

<Step S15>

If the number of surfaces that have been detected by the surface detecting portion 503a is two, the rejection determining portion 504 determines that the object represented by the recognized image is a vehicle, and determines that the recognized image is not to be rejected. The rejection determining portion 504 outputs a result of the rejection determination to the rejection determining portion 504. The processing is then advanced to Step S19.

The algorithm of the detection of the surfaces and the calculation of the surface angles of the object represented by the recognized image is not limited to the above described processing of Step S131 to Step S135, and any algorithm may be used as long as the algorithm enables calculation for a side surface and a rear surface of an object and surface angles thereof. When the corresponding recognized image on the bird's-eye view image is used in the algorithm, the surfaces of the object to be used in the rejection processing are able to be detected accurately. In this detection, if, for example, three or more surfaces are detected by a particular algorithm, the object represented by the recognized image may at least be determined to be not a side wall portion, and that recognized image may be not rejected.

<Step S16>

The rejection determining portion 504 determines whether or not the surface angle calculated by the surface angle calculating portion 503b for the surface, which is of the object represented by the recognized image and which has been detected by the surface detecting portion 503a, falls within a predetermined range (for example, 80 degrees to 100 degrees, or the like). If the surface angle falls within the predetermined range (Step S16: Yes), the processing is advanced to Step S17, and if the surface angle is not included in the predetermined range (Step S16: No), the processing is advanced to Step S18.

<Step S17>

If the surface angle calculated by the surface angle calculating portion 503b for the surface, which is of the object represented by the recognized image and which has been detected by the surface detecting portion 503a, falls within the predetermined range, the rejection determining portion 504 determines that the object represented by the recognized image is a side wall object, and determines that the recognized image is to be rejected. The rejection determining portion 504 outputs a result of the rejection determination, to the output portion 505. The object represented by the recognized image is determined to be a side wall object if the surface angle falls within the predetermined range, for enabling, as illustrated in FIG. 21, a side wall portion W to be determined as a side wall object even if a wall surface of the side wall portion W is not parallel to the traveling direction (90 degrees) of the own car (vehicle 70). The processing is then advanced to Step S19.

<Step S18>

If the surface angle calculated by the surface angle calculating portion 503b for the surface, which is of the object represented by the recognized image and which has been detected by the surface detecting portion 503a, does not fall within the predetermined range, the rejection determining portion 504 determines that the object represented by the recognized image is not a side wall object, and determines that the recognized image is not to be rejected. The rejection determining portion 504 outputs a result of the rejection determination, to the output portion 505. The processing is then advanced to Step S19.

<Step S19>

The output portion 505 includes the result of the rejection determination output from the rejection determining portion 504, that is, a rejection flag indicating whether or not the recognized image is to be rejected, in the recognized image information, and sends the recognized image information including the rejection flag to the tracking determining portion 550. The output portion 505 has been described as outputting, to the tracking determining portion 550, recognized image information indicating that a recognized image representing a side wall object is to be rejected, but the embodiment is not limited to this output. For example, as a result of rejection determination processing of the rejection portion 500, only recognized image information of a recognized image not to be rejected may be sent to the tracking determining portion 550, and recognized image information of a recognized image to be rejected may be not transmitted. In this case, since recognized image information of a recognized image to be rejected is not received by the vehicle control device 6, use of this recognized image in the various kinds of vehicle control is able to be prevented.

The above described processing of Step S11 to Step S19 is executed for each recognized image extracted by the clustering portion 400.

As described above: the second generating portion 502 generates a bird's-eye view image from a disparity image; the surface processing portion 503 identifies, on the bird's-eye view image, a corresponding recognized image corresponding to a recognized image on a reference image Ia represented by recognized image information; the surface detecting portion 503a detects a surface or surfaces based on the corresponding recognized image; the surface angle calculating portion 503b calculates a surface angle or angles of the surface or surfaces; and the rejection determining portion 504 determines, based on the number of surfaces detected for an object in the recognized image and the surface angle/angles, whether or not the recognized image is of a side wall object, and rejects the recognized image if the recognized image is of a side wall object. Thereby, determination accuracy for a recognized object (for example, a side wall object) is able to be improved, and this improvement enables accuracy of rejection to be improved. Further, the vehicle control device 6 is prevented thereby from tracking any recognized object that is not a target of control, and is able to execute tracking of vehicles that are objects represented by recognized images that have been correctly recognized. Such a configuration should be optimized throughout the whole system, and in what block preprocessing is to be executed may be freely modified by the designer.

As described above, the rejection portion 500 includes the second generating portion 502 that generates a bird's-eye view image from a disparity image received by the input portion 501, but the embodiment is not limited to this configuration. For example, a configuration may be adopted, in which the input portion 501 receives a bird's-eye view image generated from a disparity image upstream of the recognition processing portion 5 (for example, in the disparity value deriving portion 3) and the surface processing portion 503 uses that bird's-eye view image.

Figure 22:
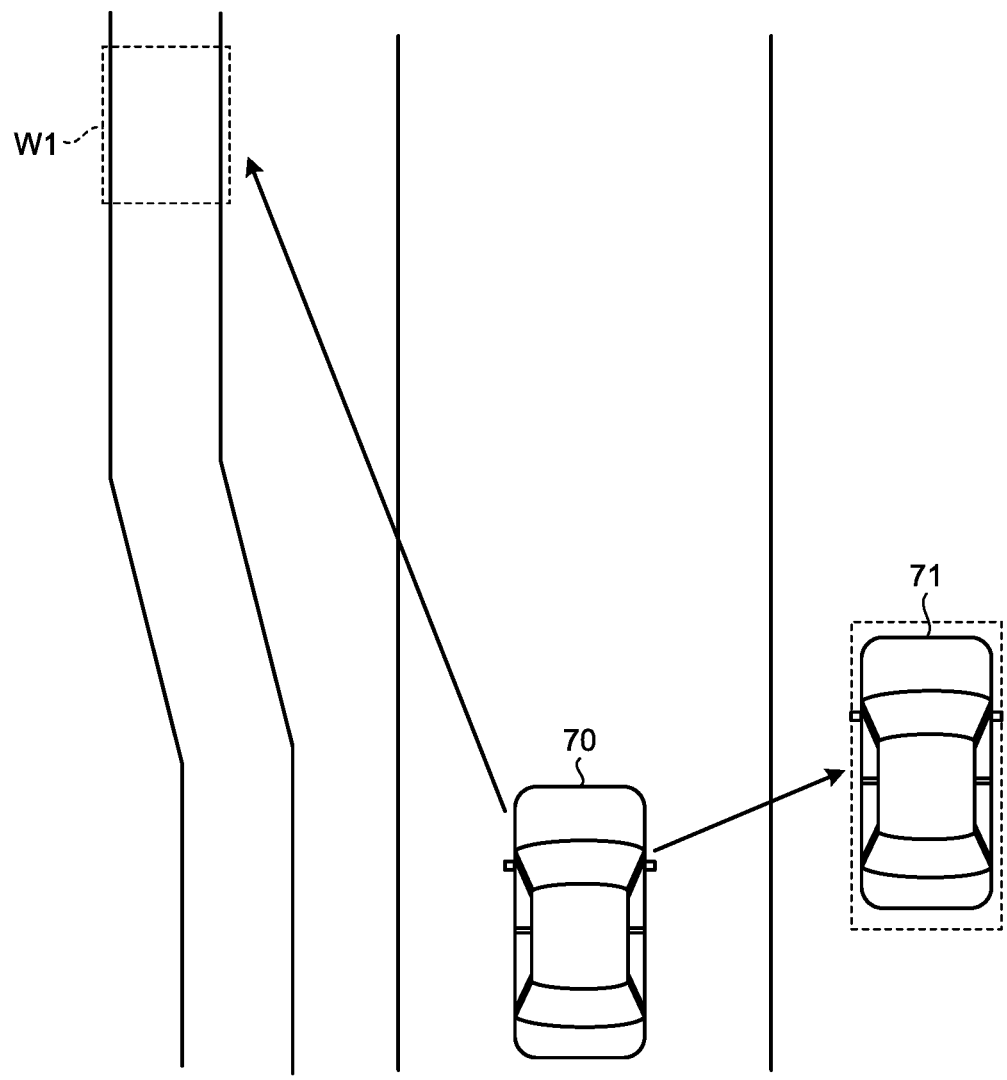
FIG. 22 is a diagram for explanation of distances to recognized objects.

(Modification) FIG. 22 is a diagram for explanation of distances to recognized objects. While reference is made to FIG. 22, operation of determining, from a distance of an object from the own car (vehicle 70), whether or not the object is to be made a target of rejection determination processing will be described as a modification of the embodiment.

In the above described first embodiment, for each of recognized images extracted by the clustering portion 400, rejection determination processing by the rejection portion 500 is executed. In this modification, for example, the input portion 501 of the rejection portion 500 finds, based on a disparity image, a distance to an object in a recognized image represented by received recognized image information, and if that distance is determined to be less than a predetermined value, the recognized image is not included in a target of rejection determination processing by the rejection portion 500. For example, it is assumed herein that a distance of another vehicle 71 illustrated in FIG. 22 from the own car (vehicle 70) is determined to be less than the predetermined value and is not included in the target of rejection determination processing.

On the contrary, if the distance is determined to be equal to or larger than the predetermined value, the input portion 501 includes the recognized image in the target of rejection determination processing by the rejection portion 500. For example, it is assumed herein that a distance of a side wall portion W1 illustrated in FIG. 22 from the own car (vehicle 70) is determined to be equal to or larger than the predetermined value and is included in the target of rejection determination processing.

The input portion 501 may, for example, include a result of the determination of whether the recognized image is to be made the target of rejection determination processing by the rejection portion 500, in the recognized image information representing the recognized image. The surface processing portion 503 and the rejection determining portion 504 may refer to the determination result included in the recognized image information, and determine whether or not rejection determination processing is to be executed.

As a result, among recognized images extracted by the clustering portion 400, a recognized image at a distance less than the predetermined value from the own car (vehicle 70) is not made the target of rejection determination processing by the rejection portion 500, and thus load of the processing by the rejection portion 500 is able to be reduced, and incorrect rejection of any overtaking vehicle or the like is able to be prevented.

Second Embodiment

Aspects of an object recognition device according to a second embodiment different from the object recognition device 1 according to the first embodiment will be described mainly. In this embodiment, operation of determining whether a corresponding recognized image is of a vehicle or of a side wall object when the number of surfaces detected from the corresponding recognized image is two will be described. A hardware configuration and a functional block configuration of the object recognition device, and a functional block configuration of a disparity value arithmetic processing portion 300, according to this embodiment, are the same as the configurations described with respect to the first embodiment. Further, block matching processing by a disparity value deriving portion 3 and clustering processing in a clustering portion 400, according to this embodiment, are the same as the operations described with respect to the first embodiment.

(Configurations and Operations of Functional Blocks of Object Recognition Device)

Figure 23:
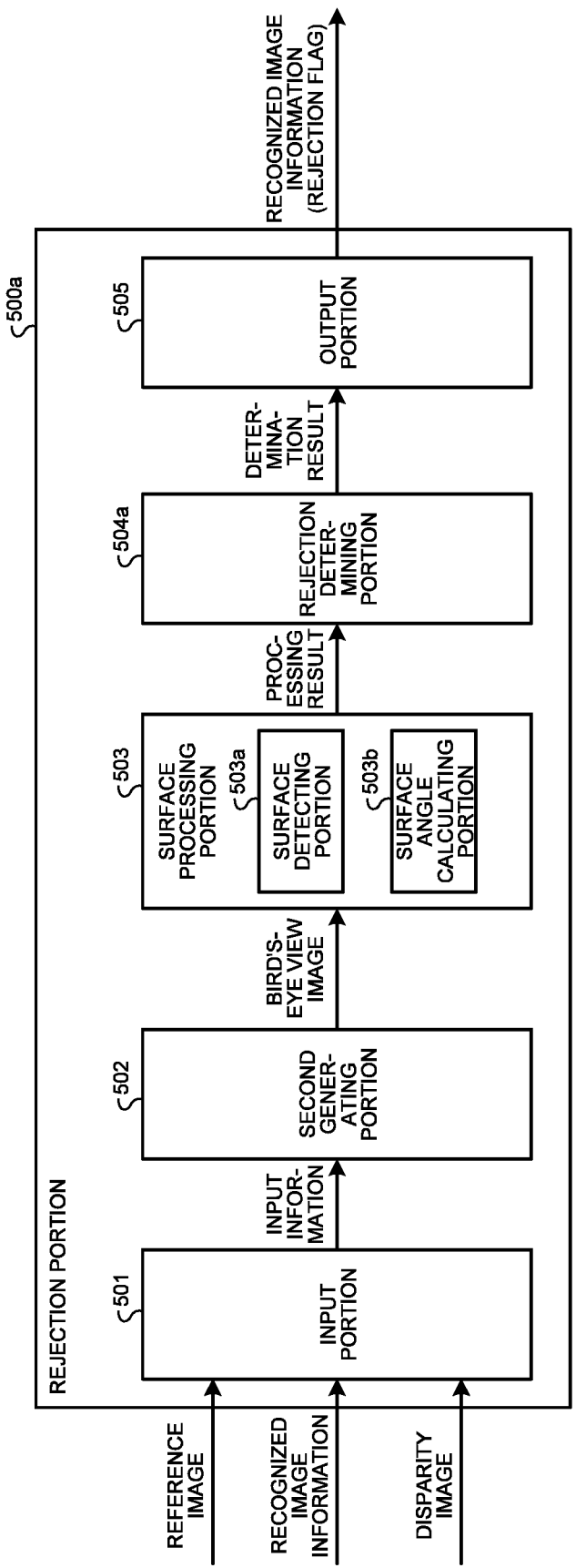
FIG. 23 is a diagram illustrating an example of a functional block configuration of a rejection portion of an object recognition device according to a second embodiment.

FIG. 23 is a diagram illustrating an example of a functional block configuration of a rejection portion of the object recognition device according to the second embodiment. While reference is made to FIG. 23, configurations and operations of functional blocks of a rejection portion 500a of a recognition processing portion 5 according to this embodiment will be described.

The recognition processing portion 5 according to this embodiment includes the rejection portion 500a, instead of the rejection portion 500 that the recognition processing portion 5 according to the first embodiment includes. As illustrated in FIG. 23, the rejection portion 500a includes an input portion 501 (input unit), a second generating portion 502 (first generating unit), a surface processing portion 503, a rejection determining portion 504a (determining unit), and an output portion 505 (output unit). Operations of the input portion 501, the second generating portion 502, the surface processing portion 503, and the output portion 505, according to this embodiment, are the same as the operations described with respect to the first embodiment.

The rejection determining portion 504a has a function of determining, based on processing results output from the surface processing portion 503, whether or not a recognized image on a reference image Ia represented by recognized image information included in the processing results is to be rejected. In particular, when the number of surfaces detected by the surface detecting portion 503a is two, the rejection determining portion 504a determines whether or not the object in the recognized image is of a vehicle, based on a ratio between lengths of the bases (or upper sides) of these surfaces, or between areas of these surfaces. The rejection determining portion 504a outputs a result of the rejection determination, to the output portion 505. Details of the operation of the rejection determining portion 504a will be described later with reference to FIG. 24 to FIG. 26.

Each of the input portion 501, the second generating portion 502, the surface processing portion 503, the rejection determining portion 504a, and the output portion 505 illustrated in FIG. 23 is realized by the FPGA 51 illustrated in FIG. 6. A part or all of the input portion 501, the second generating portion 502, the surface processing portion 503, the rejection determining portion 504a, and the output portion 505 may be realized by, instead of the FPGA 51 that is a hardware circuit, a program stored in the ROM 53 being executed by the CPU 52.

Functions of the input portion 501, the second generating portion 502, the surface processing portion 503, the rejection determining portion 504a, and the output portion 505, of the rejection portion 500a illustrated in FIG. 23 have been disclosed conceptually, but the rejection portion 500a is not limited to this configuration. For example, some of the functional portions illustrated as independent functional portions in the rejection portion 500a illustrated in FIG. 23 may be configured as a single functional portion. On the contrary, the function that any one of the functional portions in the rejection portion 500a illustrated in FIG. 23 has may be divided into plural functions, and may be configured as plural functional portions.

(Rejection Determination Processing of Rejection Portion)

Figure 24:
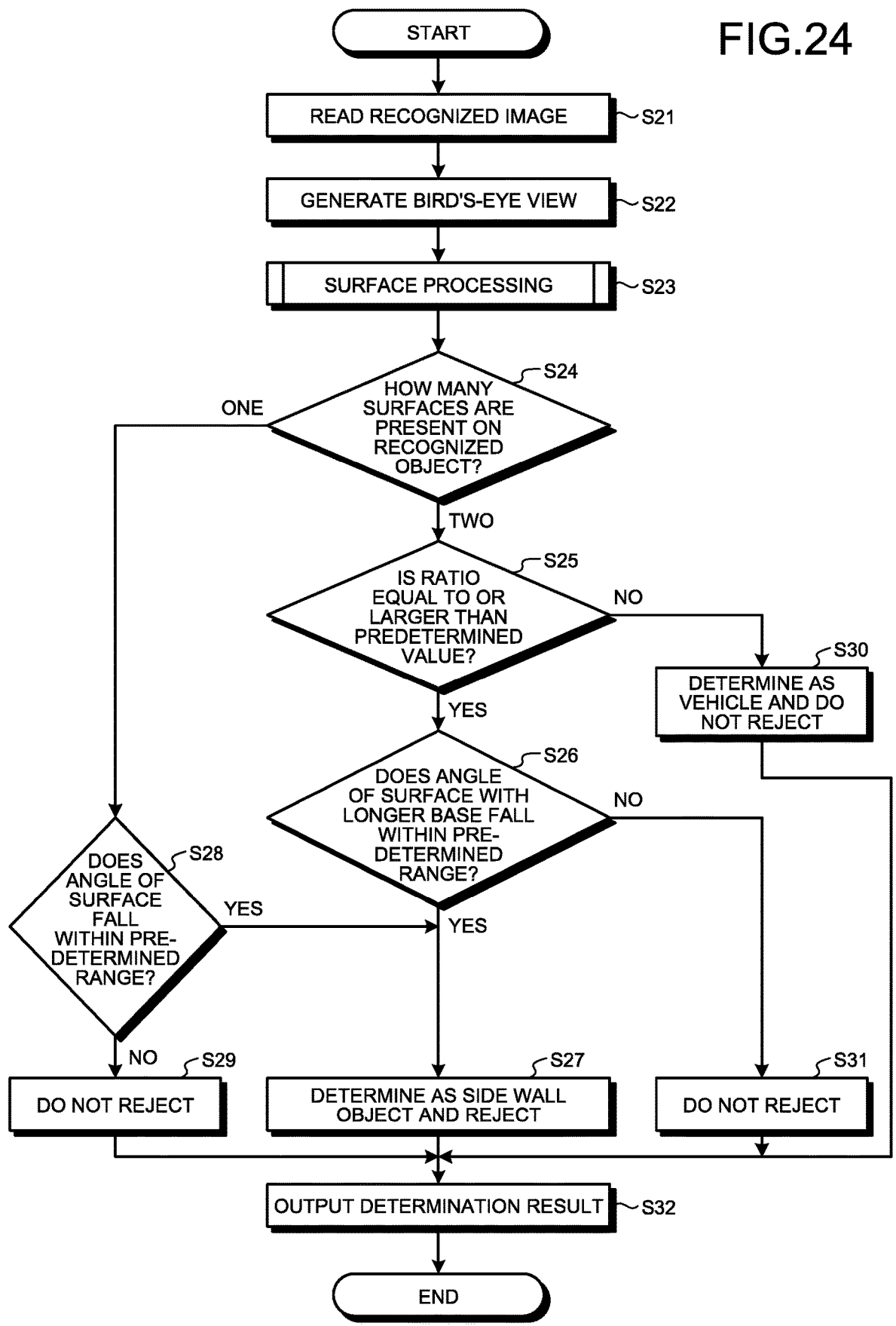
FIG. 24 is a flow chart illustrating an example of operation of rejection determination processing of the rejection portion of a recognition processing portion according to the second embodiment.
Figure 25A:
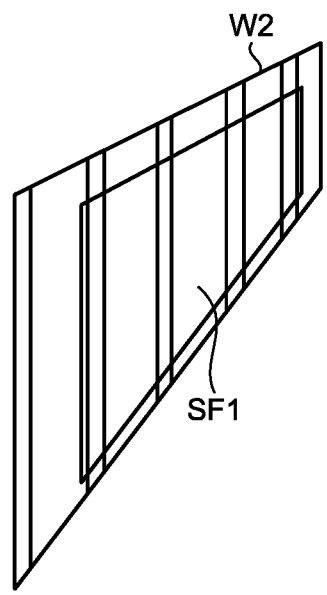
FIGS. 25A and 25B are diagrams illustrating an example of a case where two surfaces are detected for a side wall object.
Figure 25B:
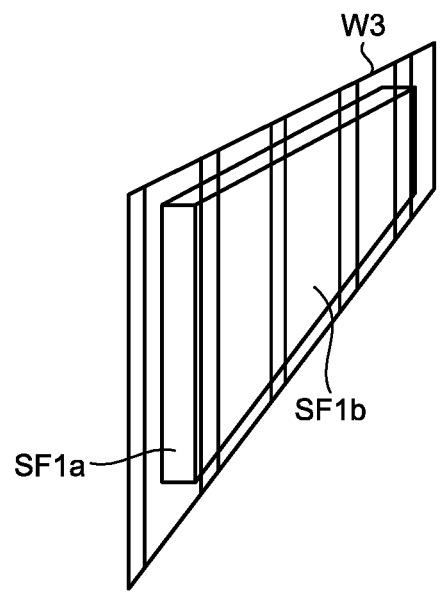
Figure 26:
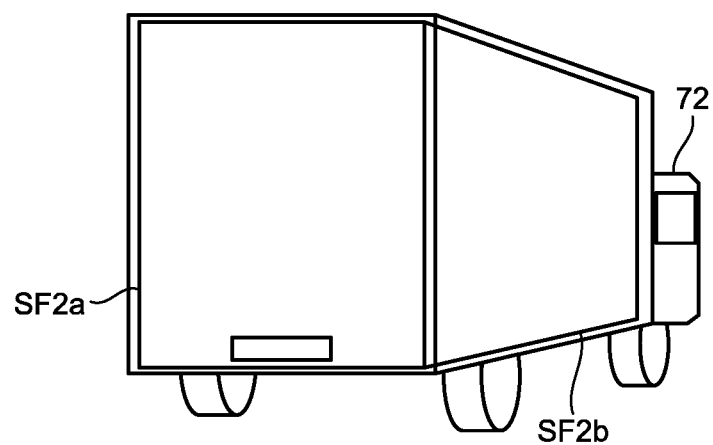
FIG. 26 is a diagram illustrating an example where two surfaces are detected for a vehicle.

FIG. 24 is a flow chart illustrating an example of operation of rejection determination processing of the rejection portion of the recognition processing portion according to the second embodiment. FIGS. 25A and 25B are diagrams illustrating an example of a case where two surfaces are detected for a side wall object. FIG. 26 is a diagram illustrating an example where two surfaces are detected for a vehicle. While reference is made to FIG. 24 to FIG. 26, a flow of an example of the operation of the rejection determination processing of the rejection portion 500a of the recognition processing portion 5 will be described.

<Step S21 to Step S23>

Processing of Step S21 to Step S23 is the same as the processing of Step S11 to Step S13, respectively, illustrated in FIG. 14 of the first embodiment. The processing is then advanced to Step S24.

<Step S24>

The rejection determining portion 504a determines, for an object represented by a recognized image (or corresponding recognized image), how many surfaces have been detected by the surface detecting portion 503a. If the number of surfaces detected by the surface detecting portion 503a is one (Step S24: one), the processing is advanced to Step S28, and if the number of surfaces is two (Step S24: two), the processing is advanced to Step S25.

For example, FIG. 25A illustrates an example where one surface SF1 has been detected by the surface detecting portion 503a for a side wall portion W2 that is an object represented by a recognized image.

<Step S25>

When the number of surfaces detected by the surface detecting portion 503a is two, the rejection determining portion 504a calculates a ratio between lengths of the bases (or upper sides) of these surfaces. As a value of the ratio, the rejection determining portion 504a calculates, for example, a value, for the lengths of the bases of the two surfaces, "(length of longer base)/(length of shorter base)". The rejection determining portion 504a then determines whether or not the calculated ratio is equal to or larger than a predetermined value. If the ratio is equal to or larger than the predetermined value (Step S25: Yes), the processing is advanced to Step S26, and if the ratio is less than the predetermined value (Step S25: No), the processing is advanced to Step S30. The lengths of the bases (or upper sides) may be lengths on the disparity image, or actual distances based on real space.

For example, FIG. 25B illustrates an example where two surfaces SF1a and SF1b have been detected by the surface detecting portion 503a for a side wall portion W3 that is an object represented by a recognized image. In this case, a ratio between a length of the base of the surface SF1a and a length of the base of the surface SF1b is equal to or larger than the predetermined value, and the side wall portion W3 may be determined as a side wall object. FIG. 26 illustrates an example where two surfaces SF2a and SF2b have been detected by the surface detecting portion 503a for another vehicle 72 that is an object represented by a recognized image. In this case, a ratio between a length of the base of the surface SF2a and a length of the base of the surface SF2b is less than the predetermined value, and the other vehicle 72 is determined as a vehicle.

The rejection determining portion 504a has been described to calculate the ratio between lengths of the bases (or upper sides) of two surfaces, but not being limited thereto, for example, the rejection determining portion 504a may determine whether or not a length of the shorter base of the bases of the two surfaces is equal to or less than a predetermined value. In this case, if the length of the shorter base is less than the predetermined value, the processing may be advanced to Step S26, and if the length is equal to or larger than the predetermined value, the processing may be advanced to Step S30.

Further, the rejection determining portion 504a has been described to calculate the ratio between lengths of the bases (or upper sides) of two surfaces, but may calculate a ratio between areas of the two surfaces. Furthermore, the areas may be, similarly to the above described lengths, areas on the disparity image, or areas found by use of actual distances based on real space.

<Step S26>

The rejection determining portion 504a determines whether or not a surface angle calculated by the surface angle calculating portion 503b for the surface having the longer base (or upper side) of the two surfaces, which are of the object represented by the recognized image and which have been detected by the surface detecting portion 503a, falls within a predetermined range (for example, 80 degrees to 100 degrees, or the like). If, at Step S25, a ratio between areas of two surfaces is calculated, the rejection determining portion 504a may determine whether or not a surface angle of the surface having the larger area of the two surfaces falls within the predetermined range. If the surface angle falls within the predetermined range (Step S26: Yes), the processing is advanced to Step S27, and if the surface angle does not fall within the predetermined range (Step S26: No), the processing is advanced to Step S31.

<Step S27>

If the surface angle calculated by the surface angle calculating portion 503b falls within the predetermined range, the rejection determining portion 504a determines that the object represented by the recognized image is a side wall object, and determines that the recognized image is to be rejected. The processing is then advanced to Step S32.

<Step S28>

The rejection determining portion 504a determines whether or not a surface angle calculated by the surface angle calculating portion 503b for the one surface, which is of the object represented by the recognized image and which has been detected by the surface detecting portion 503a, falls within a predetermined range (for example, 80 degrees to 100 degrees, or the like). If the surface angle falls within the predetermined range (Step S28: Yes), the processing is advanced to Step S27, and if the surface angle does not fall within the predetermined range (Step S28: No), the processing is advanced to Step S29.

<Step S29>

If the surface angle calculated by the surface angle calculating portion 503b for the one surface, which is of the object represented by the recognized image and which has been detected by the surface detecting portion 503a, does not fall within the predetermined range, the rejection determining portion 504a determines that the object represented by the recognized image is not a side wall object, and determines that the recognized image is not to be rejected. The rejection determining portion 504a outputs a result of the rejection determination, to the output portion 505. The processing is then advanced to Step S32.

<Step S30>

If the ratio between the lengths of the bases (or upper sides) of the two surfaces detected by the surface detecting portion 503a is less than the predetermined value, the rejection determining portion 504a determines that the object represented by the recognized image is a vehicle, and determines that the recognized image is not to be rejected. The rejection determining portion 504a outputs a result of the rejection determination, to the output portion 505. The processing is then advanced to Step S32.

<Step S31>

If the surface angle calculated by the surface angle calculating portion 503b for the surface having the longer base (or upper side) of the two surfaces, which are of the object represented by the recognized image and which have been detected by the surface detecting portion 503a, does not fall within the predetermined range, the rejection determining portion 504a determines that the object represented by the recognized image is not a side wall object, and determines that the recognized image is not to be rejected. The processing is then advanced to Step S32.

<Step S32>

Processing of Step S32 is the same as the processing of Step S19 illustrated in FIG. 14 in the first embodiment.

The above described processing of Step S21 to Step S3 is executed for each recognized image extracted by the clustering portion 400.

As described above, even in a case where two surfaces are detected by the surface detecting portion 503a, the rejection determining portion 504a finds a ratio between the bases (or upper sides) of the two surfaces, and: determines that the recognized image is of a vehicle, if the ratio is less than the predetermined value; and determines that the recognized image is of a side wall object and determines that the recognized image of the side wall object is to be rejected, if the ratio is equal to or larger than the predetermined value and the angle of the surface having the longer base falls within the predetermined range. Thereby, even if two surfaces are detected for an object represented by a recognized image, in consideration of the fact that two surfaces may be detected even for a side wall object, by calculation of a ratio between the bases of the two surfaces: whether or not the object is a side wall object or a vehicle is able to be determined based on this ratio; determination accuracy for the recognized object (for example, a side wall object) is able to be improved; and accuracy of rejection is thereby able to be improved. Further, the vehicle control device 6 is prevented thereby from tracking any recognized object that is not a target of control, and is able to execute tracking of vehicles that are objects represented by recognized images that have been correctly recognized.

According to the above described embodiments, the cost value C is evaluation value indicating non-similarity, but the cost value C may be evaluation value indicating similarity. If the cost value C is evaluation value indicating similarity, a shift amount d, at which the cost value C that is the similarity becomes maximum (the extreme value), is the disparity value dp.

Further, the embodiments above have been described with respect to the object recognition devices installed in the vehicle 70 that is an automobile, but the embodiments are not limited thereto. For example, the object recognition devices may be installed in a vehicle, such as a motorcycle, a bicycle, a wheel chair, or a farm tractor, which is another example of the vehicle. Further, the vehicle may be a moving body, which may be, not just a vehicle that is also an example of the moving body, but also a robot or the like.

Further, the robot may be, not just a moving body, but a device, such as an industrial robot, which is fixedly installed in factory automation (FA). Furthermore, the device to be fixedly installed therein may be, not just a robot, but also a monitoring camera for crime prevention, or the like.

Further, in each of the above described embodiments, if at least any of the functional portions of the rejection portion 500 or 500a of the object recognition device is realized by execution of a program, that program is incorporated in a ROM or the like beforehand and is provided. Furthermore, a program executed by the object recognition device according to each of the above described embodiments may be configured to be recorded in a computer readable recording medium, such as a CD-ROM, a flexible disk (FD), a CD-R, or a DVD, as a file of an installable format or an executable format and be provided. Moreover, the program executed in the object recognition device according to each of the above described embodiments may be configured to be provided by: being stored on a computer connected to a network, such as the Internet; and being downloaded via the network. What is more, the program executed in the object recognition device according to each of the above described embodiments may be configured to be provided or distributed via a network, such as the Internet. In addition, a program executed by the object recognition device according to each of the above described embodiments has a module configuration including at least any of the above described functional portions, and actual hardware is configured such that the above described functional portions are loaded and generated on a main storage device (the RAM 54 or the like) by the CPU 52 reading and executing the program from the above described ROM 53.

According to an embodiment, accuracy of rejection of recognized objects can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

1 OBJECT RECOGNITION DEVICE
2 MAIN BODY PORTION
3 DISPARITY VALUE DERIVING PORTION
4 COMMUNICATION LINE
5 RECOGNITION PROCESSING PORTION
6 VEHICLE CONTROL DEVICE
7 STEERING WHEEL
8 BRAKE PEDAL
10a, 10b IMAGING PORTION
11a, 11b IMAGING LENS
12a, 12b DIAPHRAGM
13a, 13b IMAGE SENSOR
20a, 20b SIGNAL CONVERSION PORTION
21a, 21b CDS
22a, 22b AGC
23a, 23b ADC
24a, 24b FRAME MEMORY
30 IMAGE PROCESSING PORTION
31 FPGA
32 CPU
33 ROM
34 RAM
35 I/F
39 BUS LINE
51 FPGA
52 CPU
53 ROM
54 RAM
55 I/F
58 CAN I/F
59 BUS LINE
60 DEVICE CONTROL SYSTEM
70 VEHICLE
71, 72 OTHER VEHICLE
100 IMAGE ACQUIRING PORTION
200 CONVERSION PORTION
300 DISPARITY VALUE ARITHMETIC PROCESSING PORTION
301 COST CALCULATING PORTION
302 DETERMINING PORTION
303 FIRST GENERATING PORTION
400 CLUSTERING PORTION
500, 500a REJECTION PORTION
501 INPUT PORTION

502 SECOND GENERATING PORTION
503 SURFACE PROCESSING PORTION
503a SURFACE DETECTING PORTION
503b SURFACE ANGLE CALCULATING PORTION
504, 504a REJECTION DETERMINING PORTION
505 OUTPUT PORTION
550 TRACKING DETERMINING PORTION
600 ROAD SURFACE
600a ROAD SURFACE PORTION
601 UTILITY POLE
601a UTILITY POLE PORTION
602 CAR
602a CAR PORTION
611 LEFT GUARD RAIL
611a LEFT GUARD RAIL PORTION
612 RIGHT GUARD RAIL
612a RIGHT GUARD RAIL PORTION
613, 614 CAR
613a, 614a CAR PORTION
AR1, AR2 AREA
B BASE LINE LENGTH
C COST VALUE
d SHIFT AMOUNT
dp DISPARITY VALUE
E OBJECT
EL EPIPOLAR LINE
f FOCAL LENGTH
Ia REFERENCE IMAGE
Ib COMPARED IMAGE
L, L0, M, M0 END POINT
N POINT
Nmax MAXIMUM FREQUENCY POINT
OM BIRD'S-EYE VIEW IMAGE
p REFERENCE PIXEL
pb REFERENCE AREA
q CANDIDATE PIXEL
qb CANDIDATE AREA
S, Sa, Sb POINT
SF1, SF1a, SF1b, SF2a, SF2b SURFACE
UM U-MAP
VM V-MAP
W, W1 TO W3 SIDE WALL PORTION
Z DISTANCE

What is claimed is:

1. An image processing device comprising:
input circuitry configured to receive a recognized image representing an object;
detecting circuitry configured to detect at least one surface of the object from a corresponding recognized image corresponding to the recognized image, the corresponding recognized image being on a frequency image indicating frequencies on a plane, the frequencies being of distance values corresponding to pixels of the recognized image;
calculating circuitry configured to calculate an angle of the at least one surface with respect to a predetermined direction; and
determining circuitry configured to determine, based on the at least one surface detected by the detecting circuitry and the angle calculated by the calculating circuitry, whether or not the recognized image is to be rejected,
wherein the determining circuitry is configured to determine that the recognized image corresponding to the corresponding recognized image is to be rejected, if a number of the at least one surface detected from the corresponding recognized image by the detecting circuitry is one and an angle of the at least one surface calculated by the calculating circuitry falls within a predetermined range.

2. The image processing device according to claim 1, wherein
the input circuitry is further configured to receive a distance image including the distance values corresponding to the pixels of the recognized image; and
the image processing device further comprises first generating circuitry configured to generate the frequency image from the distance image received by the input circuitry.

3. The image processing device according to claim 1, wherein the detecting circuitry is configured to:
identify, on the frequency image, two first pixels where straight lines representing viewing angle directions contact the corresponding recognized image;
identify, based on pixel values of pixels of two predetermined areas each including one of the two first pixels, second pixels in respective ones of the two predetermined areas;
set a semicircle passing through the two second pixels;
determine, based on pixel values of pixels on two line segments each joining an arbitrary pixel on the semicircle to one of the two second pixels, a pixel on the semicircle as a third pixel; and
detect the at least one surface, the at least one surface each including one of two line segments each joining the third pixel to one of the two second pixels.

4. The image processing device according to claim 1, wherein the determining circuitry is configured to determine that the recognized image corresponding to the corresponding recognized image is not to be rejected, if a number of the at least one surface detected from the corresponding recognized image by the detecting circuitry is two or more.

5. The image processing device according to claim 1, wherein the determining circuitry is configured to exclude the recognized image from a target of determination of whether or not the recognized image is to be rejected, if a distance to the object represented by the recognized image is less than a predetermined value, the distance being found from the distance values.

6. The information processing device according to claim 1, wherein the detecting circuitry is configured to:
calculate, if a number of the at least one surface detected from the corresponding recognized image by the detecting circuitry is two, a ratio between lengths of bases or upper sides of the two surfaces; and
determine that the recognized image corresponding to the corresponding recognized image is to be rejected, if the ratio is equal to or larger than a predetermined value and an angle of the surface having the longer base or upper side of the two surfaces falls within a predetermined range.

7. The image processing device according to claim 1, wherein the determining circuitry is configured to:
calculate, if a number of the at least one surface detected from the corresponding recognized image by the detecting circuitry is two, a ratio between areas of the two surfaces; and
determine that the recognized image corresponding to the corresponding recognized image is to be rejected, if the ratio is equal to or larger than a predetermined value and an angle of the surface having a larger area of the two surfaces falls within a predetermined range.

8. The image processing device according to claim 1, further comprising:

output circuitry configured to output information indicating that the recognized image is to be rejected, if the recognized image is determined by the determining circuitry to be rejected.

9. An object recognition device comprising:
first imaging circuitry configured to image a subject to acquire a first captured image;
second imaging circuitry arranged at a position different from a position of the first imaging circuitry, and configured to image the subject to acquire a second captured image;
second generating circuitry configured to generate a distance image, based on distance values found for the subject, from the first captured image and the second captured image;
extracting circuitry configured to recognize an object captured in the first captured image and extracts the recognized image including the object, using the distance image; and
the image processing device according to claim 1.

10. A device control system comprising:
the object recognition device according to claim 9; and
a control device configured to control a control target, based on a result of determination by the determining circuitry of whether or not the recognized image is to be rejected.

11. An image processing method comprising:
receiving a recognized image representing an object;
detecting at least one surface of the object from a corresponding recognized image corresponding to the recognized image, the corresponding recognized image being on a frequency image indicating frequencies on a plane, the frequencies being of distance values corresponding to pixels of the recognized image;
calculating an angle of the at least one surface with respect to a predetermined direction; and
determining, based on the at least one detected surface and the calculated angle, whether or not the recognized image is to be rejected,
wherein the determining determines that the recognized image corresponding to the corresponding recognized image is not to be rejected, if a number of the at least one surface detected from the corresponding recognized image by the detecting is two or more.

12. The method according to claim 11, wherein the detecting includes:
identifying, on the frequency image, two first pixels where straight lines representing viewing angle directions contact the corresponding recognized image;
identifying, based on pixel values of pixels of two predetermined areas each including one of the two first pixels, second pixels in respective ones of the two predetermined areas;
setting a semicircle passing through the two second pixels;
determining, based on pixel values of pixels on two line segments each joining an arbitrary pixel on the semicircle to one of the two second pixels, a pixel on the semicircle as a third pixel; and
detecting the at least one surface, the at least one surface each including one of two line segments each joining the third pixel to one of the two second pixels.

13. The method according to claim 11, wherein:
the determining determines that the recognized image corresponding to the corresponding recognized image is to be rejected, if a number of the at least one surface detected from the corresponding recognized image is one and an angle of the at least one surface calculated falls within a predetermined range.

14. The method according to claim 11, wherein:
the determining excludes the recognized image from a target of determination of whether or not the recognized image is to be rejected, if a distance to the object represented by the recognized image is less than a predetermined value, the distance being found from the distance values.

15. The method according to claim 11, wherein the detecting includes:
calculating, if a number of the at least one surface detected from the corresponding recognized image by the detecting is two, a ratio between lengths of bases or upper sides of the two surfaces; and
determining that the recognized image corresponding to the corresponding recognized image is to be rejected, if the ratio is equal to or larger than a predetermined value and an angle of the surface having the longer base or upper side of the two surfaces falls within a predetermined range.

16. The method according to claim 11, wherein the determining includes:
calculating, if a number of the at least one surface detected from the corresponding recognized image by the detecting is two, a ratio between areas of the two surfaces; and
determining that the recognized image corresponding to the corresponding recognized image is to be rejected, if the ratio is equal to or larger than a predetermined value and an angle of the surface having a larger area of the two surfaces falls within a predetermined range.

17. A non-transitory computer-readable medium including programmed instructions that cause a computer to function as:
input circuitry configured to receive a recognized image representing an object;
detecting circuitry configured to detect at least one surface of the object from a corresponding recognized image corresponding to the recognized image, the corresponding recognized image being on a frequency image indicating frequencies on a plane, the frequencies being of distance values corresponding to pixels of the recognized image;
calculating circuitry configured to calculate an angle of the at least one surface with respect to a predetermined direction; and
determining circuitry configured to determine, based on the at least one surface detected by the detecting circuitry and the angle calculated by the calculating circuitry, whether or not the recognized image is to be rejected,
wherein the determining circuitry is configured to exclude the recognized image from a target of determination of whether or not the recognized image is to be rejected, if a distance to the object represented by the recognized image is less than a predetermined value, the distance being found from the distance values.

18. A non-transitory computer-readable medium according to claim 17, wherein the detecting circuitry is configured to:
identify, on the frequency image, two first pixels where straight lines representing viewing angle directions contact the corresponding recognized image;

identify, based on pixel values of pixels of two predetermined areas each including one of the two first pixels, second pixels in respective ones of the two predetermined areas;
set a semicircle passing through the two second pixels;
determine, based on pixel values of pixels on two line segments each joining an arbitrary pixel on the semicircle to one of the two second pixels, a pixel on the semicircle as a third pixel; and
detect the at least one surface, the at least one surface each including one of two line segments each joining the third pixel to one of the two second pixels.

19. A non-transitory computer-readable medium according to claim 17, wherein the detecting circuitry is configured to:
calculate, if a number of the at least one surface detected from the corresponding recognized image by the detecting circuitry is two, a ratio between lengths of bases or upper sides of the two surfaces; and
determine that the recognized image corresponding to the corresponding recognized image is to be rejected, if the ratio is equal to or larger than a predetermined value and an angle of the surface having the longer base or upper side of the two surfaces falls within a predetermined range.

20. A non-transitory computer-readable medium according to claim 17, wherein the determining circuitry is configured to:
calculate, if a number of the at least one surface detected from the corresponding recognized image by the detecting circuitry is two, a ratio between areas of the two surfaces; and
determine that the recognized image corresponding to the corresponding recognized image is to be rejected, if the ratio is equal to or larger than a predetermined value and an angle of the surface having a larger area of the two surfaces falls within a predetermined range.

* * * * *